US009008856B2

(12) United States Patent
Ricci et al.

(10) Patent No.: US 9,008,856 B2
(45) Date of Patent: Apr. 14, 2015

(54) CONFIGURABLE VEHICLE CONSOLE

(71) Applicant: Flextronics AP, LLC, Milpitas, CA (US)

(72) Inventors: Christopher P. Ricci, Saratoga, CA (US); Tadd F. Wilson, Centennial, CO (US)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 13/679,350

(22) Filed: Nov. 16, 2012

(65) Prior Publication Data

US 2013/0144463 A1    Jun. 6, 2013

Related U.S. Application Data

(60) Provisional application No. 61/560,509, filed on Nov. 16, 2011, provisional application No. 61/637,164, (Continued)

(51) Int. Cl.
| | |
|---|---|
| *G05D 1/00* | (2006.01) |
| *H04M 11/04* | (2006.01) |
| *G06Q 30/02* | (2012.01) |

(Continued)

(52) U.S. Cl.
CPC .............. *G06Q 30/0265* (2013.01); *G06F 9/54* (2013.01); *B60R 7/04* (2013.01); *G08C 19/00* (2013.01); *G06N 5/02* (2013.01); *H04L 67/02* (2013.01); *G08G 1/143* (2013.01); *H04W 84/005* (2013.01); *H04W 4/001* (2013.01); *H04W 4/046* (2013.01); *G06Q 40/08* (2013.01); *G06F 17/00* (2013.01); *G06F 17/30386* (2013.01); *G06F 3/0484* (2013.01); *G08G 1/16* (2013.01); *G06F 13/364* (2013.01); *H04N 21/482* (2013.01); *G06F 21/10* (2013.01); *G08G 1/096791* (2013.01); *G06F 13/14* (2013.01); *B60R 16/037* (2013.01); *B60W 30/182* (2013.01); *B60W 2540/28* (2013.01); *B60W 2040/0872* (2013.01);

(Continued)

(58) Field of Classification Search
USPC .................... 701/1; 340/425.5; 715/744, 765; 455/404.1
See application file for complete search history.

(56) References Cited

U.S. PATENT DOCUMENTS

| | | |
|---|---|---|
| 4,476,954 A | 10/1984 | Johnson et al. |
| 4,875,391 A | 10/1989 | Leising et al. |

(Continued)

FOREIGN PATENT DOCUMENTS

EP        2192015       6/2010

OTHER PUBLICATIONS

U.S. Appl. No. 13/420,240, filed Mar. 14, 2012, Ricci.
(Continued)

*Primary Examiner* — Thomas G Black
*Assistant Examiner* — Tyler Paige
(74) *Attorney, Agent, or Firm* — Sheridan Ross P.C.

(57) ABSTRACT

Methods and systems for a configurable vehicle console are provided. Specifically, a configurable console may comprise one or more displays that are capable of receiving input from a user. At least one of these displays may be removed from the console of a vehicle and operated as a stand-alone computing platform. Moreover, it is anticipated that each one or more of the displays of the console may be configured to present a plurality of custom applications that, when manipulated by at least one user, are adapted to control functions associated with a vehicle and/or associated peripheral devices.

20 Claims, 13 Drawing Sheets

Related U.S. Application Data filed on Apr. 23, 2012, provisional application No. 61/646,747, filed on May 14, 2012, provisional application No. 61/653,275, filed on May 30, 2012, provisional application No. 61/653,264, filed on May 30, 2012, provisional application No. 61/653,563, filed on May 31, 2012, provisional application No. 61/663,335, filed on Jun. 22, 2012, provisional application No. 61/672,483, filed on Jul. 17, 2012, provisional application No. 61/714,016, filed on Oct. 15, 2012, provisional application No. 61/715,699, filed on Oct. 18, 2012.

(51) Int. Cl.

| | |
|---|---|
| *G06F 9/54* | (2006.01) |
| *B60R 7/04* | (2006.01) |
| *G08C 19/00* | (2006.01) |
| *G06N 5/02* | (2006.01) |
| *H04L 29/08* | (2006.01) |
| *G08G 1/14* | (2006.01) |
| *H04W 84/00* | (2009.01) |
| *H04W 4/00* | (2009.01) |
| *H04W 4/04* | (2009.01) |
| *G06Q 40/08* | (2012.01) |
| *G06F 17/00* | (2006.01) |
| *G06F 17/30* | (2006.01) |
| *G06F 3/0484* | (2013.01) |
| *G08G 1/16* | (2006.01) |
| *G06F 13/364* | (2006.01) |
| *H04N 21/482* | (2011.01) |
| *G06F 21/10* | (2013.01) |
| *G08G 1/0967* | (2006.01) |
| *G06F 13/14* | (2006.01) |
| *B60R 16/037* | (2006.01) |
| *B60W 30/182* | (2012.01) |
| *B60W 40/08* | (2012.01) |
| *B60W 50/00* | (2006.01) |

(52) U.S. Cl.
CPC ... *B60W 2050/0095* (2013.01); *B60W 2540/22* (2013.01); *B60W 2540/26* (2013.01)

(56) References Cited

U.S. PATENT DOCUMENTS

| | | | |
|---|---|---|---|
| 5,847,661 A | 12/1998 | Ricci | |
| 5,949,345 A | 9/1999 | Beckert et al. | |
| D429,684 S | 8/2000 | Johnson | |
| 6,157,321 A | 12/2000 | Ricci | |
| 6,202,008 B1 | 3/2001 | Beckert et al. | |
| 6,339,826 B2 | 1/2002 | Hayes, Jr. et al. | |
| 6,662,077 B2 | 12/2003 | Haag | |
| 6,690,260 B1 | 2/2004 | Ashihara | |
| 6,785,531 B2 | 8/2004 | Lepley et al. | |
| 6,816,783 B2 | 11/2004 | Hashima et al. | |
| 7,021,691 B1 | 4/2006 | Schmidt et al. | |
| 7,187,947 B1 | 3/2007 | White et al. | |
| 7,566,083 B2 | 7/2009 | Vitito | |
| 7,683,771 B1 | 3/2010 | Loeb | |
| 7,738,462 B2 | 6/2010 | Hwang | |
| 7,802,832 B2 | 9/2010 | Carnevali | |
| 7,881,703 B2 | 2/2011 | Roundtree et al. | |
| 7,969,290 B2 | 6/2011 | Waeller et al. | |
| 8,131,419 B2 | 3/2012 | Ampunan et al. | |
| 8,447,598 B2* | 5/2013 | Chutorash et al. | 704/231 |
| 8,527,146 B1 | 9/2013 | Jackson et al. | |
| 2001/0010516 A1 | 8/2001 | Roh et al. | |
| 2002/0126876 A1 | 9/2002 | Paul et al. | |
| 2002/0169551 A1 | 11/2002 | Inoue et al. | |
| 2003/0055557 A1 | 3/2003 | Dutta et al. | |
| 2004/0039500 A1 | 2/2004 | Amendola et al. | |
| 2004/0162019 A1* | 8/2004 | Horita et al. | 455/3.02 |
| 2004/0260438 A1* | 12/2004 | Chernetsky et al. | 701/36 |
| 2005/0065678 A1 | 3/2005 | Smith et al. | |
| 2005/0085215 A1* | 4/2005 | Kokko et al. | 455/404.1 |
| 2005/0114864 A1 | 5/2005 | Surace | |
| 2005/0144156 A1 | 6/2005 | Barber | |
| 2006/0015819 A1 | 1/2006 | Hawkins et al. | |
| 2006/0044119 A1 | 3/2006 | Egelhaaf | |
| 2006/0047386 A1 | 3/2006 | Kanevsky et al. | |
| 2006/0125631 A1 | 6/2006 | Sharony | |
| 2006/0200587 A1* | 9/2006 | Hindman | 710/3 |
| 2006/0259210 A1 | 11/2006 | Tanaka et al. | |
| 2006/0288382 A1 | 12/2006 | Vitito | |
| 2007/0182816 A1 | 8/2007 | Fox | |
| 2007/0194902 A1 | 8/2007 | Blanco et al. | |
| 2007/0195997 A1 | 8/2007 | Paul et al. | |
| 2007/0213090 A1 | 9/2007 | Holmberg | |
| 2008/0051957 A1 | 2/2008 | Breed et al. | |
| 2008/0052627 A1 | 2/2008 | Oguchi | |
| 2008/0143085 A1 | 6/2008 | Breed et al. | |
| 2008/0216067 A1 | 9/2008 | Villing | |
| 2009/0168974 A1* | 7/2009 | Mc Cormick | 379/45 |
| 2009/0180668 A1 | 7/2009 | Jones et al. | |
| 2009/0189373 A1 | 7/2009 | Schramm et al. | |
| 2009/0241883 A1 | 10/2009 | Nagoshi et al. | |
| 2009/0247132 A1* | 10/2009 | Sumcad et al. | 455/412.1 |
| 2009/0278806 A1 | 11/2009 | Duarte et al. | |
| 2009/0319181 A1 | 12/2009 | Khosravy et al. | |
| 2010/0069115 A1 | 3/2010 | Liu | |
| 2010/0076764 A1* | 3/2010 | Chengalvarayan | 704/251 |
| 2010/0082559 A1* | 4/2010 | Sumcad et al. | 707/695 |
| 2010/0121570 A1 | 5/2010 | Tokue et al. | |
| 2010/0121645 A1 | 5/2010 | Seitz et al. | |
| 2010/0127847 A1 | 5/2010 | Evans et al. | |
| 2010/0167727 A1* | 7/2010 | Madhavan et al. | 455/434 |
| 2010/0167737 A1* | 7/2010 | Madhavan et al. | 455/435.2 |
| 2010/0250071 A1 | 9/2010 | Pala et al. | |
| 2010/0256903 A1* | 10/2010 | Johnson | 701/209 |
| 2010/0268426 A1 | 10/2010 | Pathak et al. | |
| 2010/0289632 A1 | 11/2010 | Seder et al. | |
| 2010/0325626 A1 | 12/2010 | Greschler et al. | |
| 2011/0028138 A1 | 2/2011 | Davies-Moore et al. | |
| 2011/0082615 A1* | 4/2011 | Small et al. | 701/29 |
| 2011/0093846 A1 | 4/2011 | Moinzadeh et al. | |
| 2011/0117933 A1 | 5/2011 | Andersson | |
| 2011/0175754 A1 | 7/2011 | Karpinsky | |
| 2011/0225527 A1 | 9/2011 | Law et al. | |
| 2011/0234369 A1 | 9/2011 | Cai et al. | |
| 2012/0029852 A1 | 2/2012 | Goff et al. | |
| 2012/0065996 A1* | 3/2012 | Daoud et al. | 705/3 |
| 2012/0081267 A1 | 4/2012 | Sirpal et al. | |
| 2012/0081311 A1 | 4/2012 | Sirpal et al. | |
| 2012/0083971 A1 | 4/2012 | Preston | |
| 2012/0092251 A1 | 4/2012 | Hashimoto et al. | |
| 2012/0239242 A1 | 9/2012 | Uehara | |
| 2012/0252364 A1* | 10/2012 | Inabathuni et al. | 455/41.2 |
| 2013/0099940 A1 | 4/2013 | Protopapas | |
| 2013/0134730 A1 | 5/2013 | Ricci | |
| 2013/0135118 A1 | 5/2013 | Ricci | |
| 2013/0138591 A1 | 5/2013 | Ricci | |
| 2013/0138714 A1 | 5/2013 | Ricci | |
| 2013/0141247 A1 | 6/2013 | Ricci | |
| 2013/0141252 A1 | 6/2013 | Ricci | |
| 2013/0143495 A1 | 6/2013 | Ricci | |
| 2013/0143546 A1 | 6/2013 | Ricci | |
| 2013/0143601 A1 | 6/2013 | Ricci | |
| 2013/0144459 A1 | 6/2013 | Ricci | |
| 2013/0144460 A1 | 6/2013 | Ricci | |
| 2013/0144461 A1 | 6/2013 | Ricci | |
| 2013/0144462 A1 | 6/2013 | Ricci | |
| 2013/0144469 A1 | 6/2013 | Ricci | |
| 2013/0144470 A1 | 6/2013 | Ricci | |
| 2013/0144474 A1 | 6/2013 | Ricci | |
| 2013/0144486 A1 | 6/2013 | Ricci | |
| 2013/0144520 A1 | 6/2013 | Ricci | |
| 2013/0144657 A1 | 6/2013 | Ricci | |
| 2013/0145065 A1 | 6/2013 | Ricci | |
| 2013/0145279 A1 | 6/2013 | Ricci | |

(56) References Cited

U.S. PATENT DOCUMENTS

| | | |
|---|---|---|
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0152003 A1 | 6/2013 | Ricci et al. |
| 2013/0154298 A1 | 6/2013 | Ricci |
| 2013/0158821 A1 | 6/2013 | Ricci |
| 2013/0166097 A1 | 6/2013 | Ricci |
| 2013/0167159 A1 | 6/2013 | Ricci et al. |
| 2013/0231800 A1 | 9/2013 | Ricci |
| 2013/0241720 A1 | 9/2013 | Ricci et al. |

OTHER PUBLICATIONS

U.S. Appl. No. 13/462,593, filed May 2, 2013, Ricci et al.
U.S. Appl. No. 13/462,596, filed May 2, 2013, Ricci et al.
U.S. Appl. No. 13/840,240, filed Mar. 15, 2013, Ricci.
International Search Report and Written Opinion for International (PCT) Patent Application No. PCT/US12/65421 mailed Feb. 20, 2013, 13 pages.
International Search Report and Written Opinion for International (PCT) Patent Application No. PCT/US12/65470 mailed Mar. 7, 2013, 14 pages.
International Search Report and Written Opinion for International (PCT) Patent Application No. PCT/US12/65474 mailed Feb. 28, 2013, 9 pages.
"Cadillac: 2013 XTS Full-Size Luxury Sedan," Cadillac.com, 4 pages, Jun. 2012 internet archive, found at: (web.archive.org/web/20120606185204/http://www.cadillac.com/xts-luxury-sedan.html).
Cairnie et al., "Using finger-pointing to operate secondary controls in automobiles," Proceedings of the IEEE Intelligent Vehicles Symposium 2000, Oct. 3-5, 2000, 6 pages.
Lee "Cadillac revamps the instrument panel with CUE," CNET Reviews, Oct. 11, 2011, 5 pages, found at: (reviews.cnet.com/8301-12261_7-20118807-10356022/cadillac-revamps-the-instrument-panel-with-cue/).
Marturano "General Motors Takes a CUE from Customers," InContext, Nov. 8, 2011, 3 pages, found at: (incontextdesign.com/blog/general-motors-takes-a-cue-from-customers/).
"Time-triggered CAN," CIA, © 2001-2013, 4 pages, found at: (www.can-cia.org/index.php?id+166).
Davis et al. "Controller Area Network (CAN) schedulability analysis: Refuted, revisited and revised," Real-Time Systems, Apr. 2007, vol. 35, No. 3, pp. 239-272.
Di Natale "Controller Area Network," Dec. 2009, 54 pages.
Fonseca et al. "Scheduling for a TTCAN network with a stochastic optimization algorithm," Proceedings 8th Internatioanl CAN Conference, Jan. 2002, 7 pages.
Hartwich et al. "CAN Network with Time Triggered Communication," Robert Bosch GmbH Proceedings 7th International CAN Conference, Jul. 2000, 7 pages.
Idstein et al. "Using the Controller Area Network for Communication Between Prostesis Sensors and Control Systems," Proceedings of the 2011 MyoElectric Controls/Powered Prostetics Symposium Fredericton, New Brunswick, Canada, Aug. 14-19, 2011, 4 pages.
U.S. Appl. No. 13/963,728, filed Aug. 9, 2013, Ricci.
Purcher "Apple Invents In-Vehicle Holistic ID for "iOS in the Car","Patently Apple, Dec. 2013, 8 pages [retrieved on Dec. 12, 2013 from: www.patentlyapple.com/patently-apple/2013/12/apple-invents-in-vehicle-holistic-id-for-ios-in-the-car.html].
International Preliminary Report on Patentablity for International (PCT) Patent Application No. PCT/US12/65421, mailed Oct. 17, 2013 33 pages.
Official Action for U.S. Appl. No. 13/679,204, mailed Nov. 14, 2013 20 pages.
"A8: Technology as standard," Screen-shots from Audi.co.uk, 2014 [retrieved on Apr. 16, 2014], 1 page. Retrieved from: www.audi.co.uk/new-cars/a8/a8/technology-as-standard/mmi-touch.html.
"Audi A8 MMI Touch," Audi of America, Jan. 7, 2011, [retrieved on Apr. 16, 2014], 2 pages. Retrieved from: www.youtube.com/watch?v=O2nZ-WHo9IA.
Diaz, "Audi New MMI Touch Input System Makes Perfect Sense," Gizmodo.com, Dec. 1, 2009 [retrieved on Apr. 16, 2014], 12 pages. Retrieved from: http://gizmodo.com/5416342/audi-new-mmi-touch-input-system-makes-perfect-sense.
International Preliminary Report on Patentability for International (PCT) Patent Application No. PCT/US2012/065470 mailed May 30, 2014, 12 pages.
International Preliminary Report on Patentability for International (PCT) Patent Application No. PCT/US2012065474 mailed May 30, 2014, 8 pages.
Official Action for U.S. Appl. No. 13/420,236, mailed Apr. 7, 2014 30 pages.
Official Action for U.S. Appl. No. 13/462,593, mailed Dec. 19, 2013 18 pages.
Official Action for U.S. Appl. No. 13/679,412, mailed Jul. 18, 2014 15 pages.
Official Action for U.S. Appl. No. 13/420,240, mailed Dec. 17, 2013 14 pages.
Notice of Allowance for U.S. Appl. No. 13/679,204, mailed Mar. 18, 2014 7 pages.
Official Action for U.S. Appl. No. 13/679,358, mailed Jan. 27, 2014 18 pages.
Official Action for U.S. Appl. No. 13/679,358, mailed Nov. 17, 2014 16 pages.
Official Action for U.S. Appl. No. 13/679,363, mailed Nov. 21, 2014 14 pages.
Official Action for U.S. Appl. No. 13/679,363, mailed Oct. 28, 2014 17 pages.
Official Action for U.S. Appl. No. 13/963,728, mailed Nov. 19, 2014 12 pages.

* cited by examiner

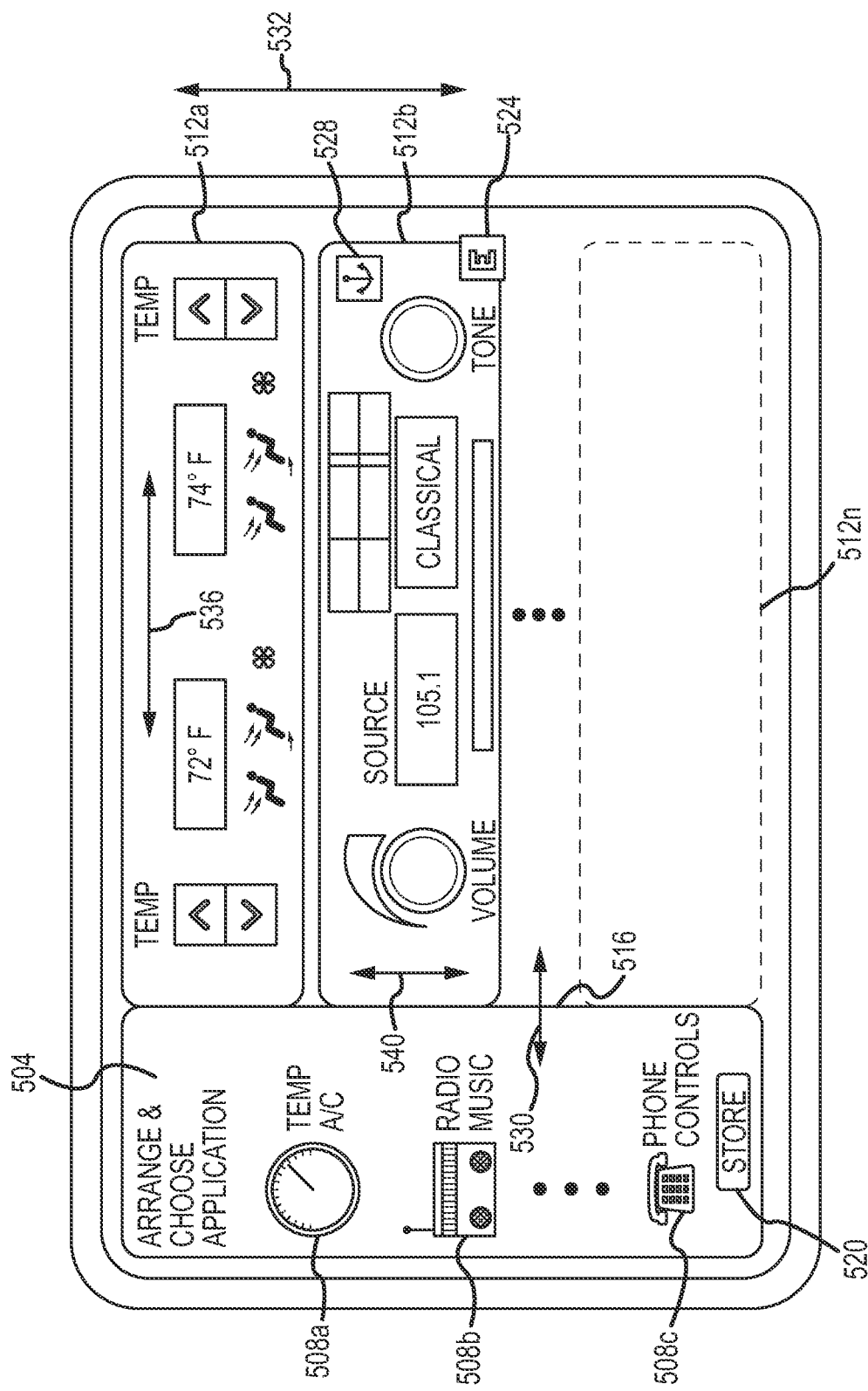

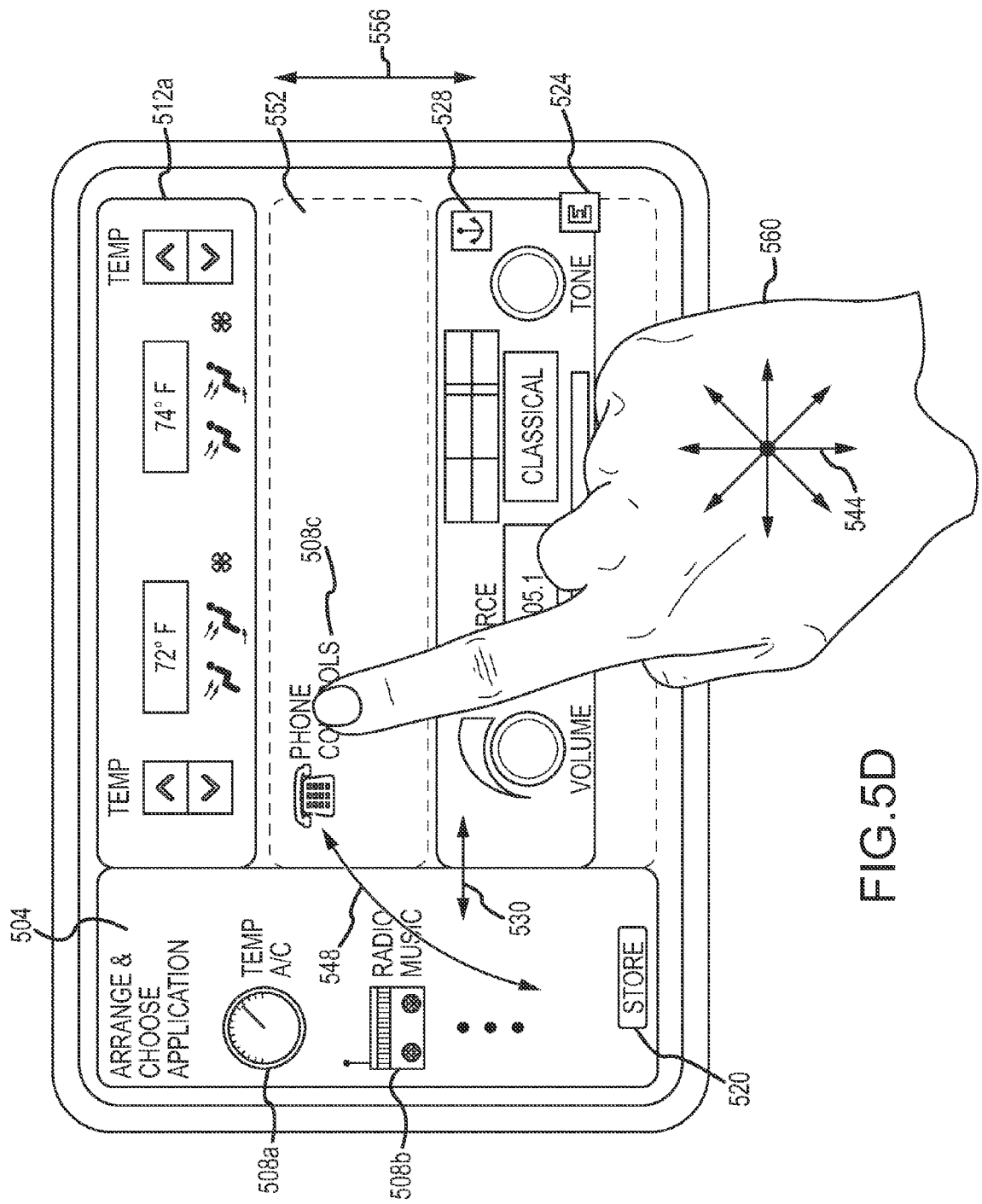

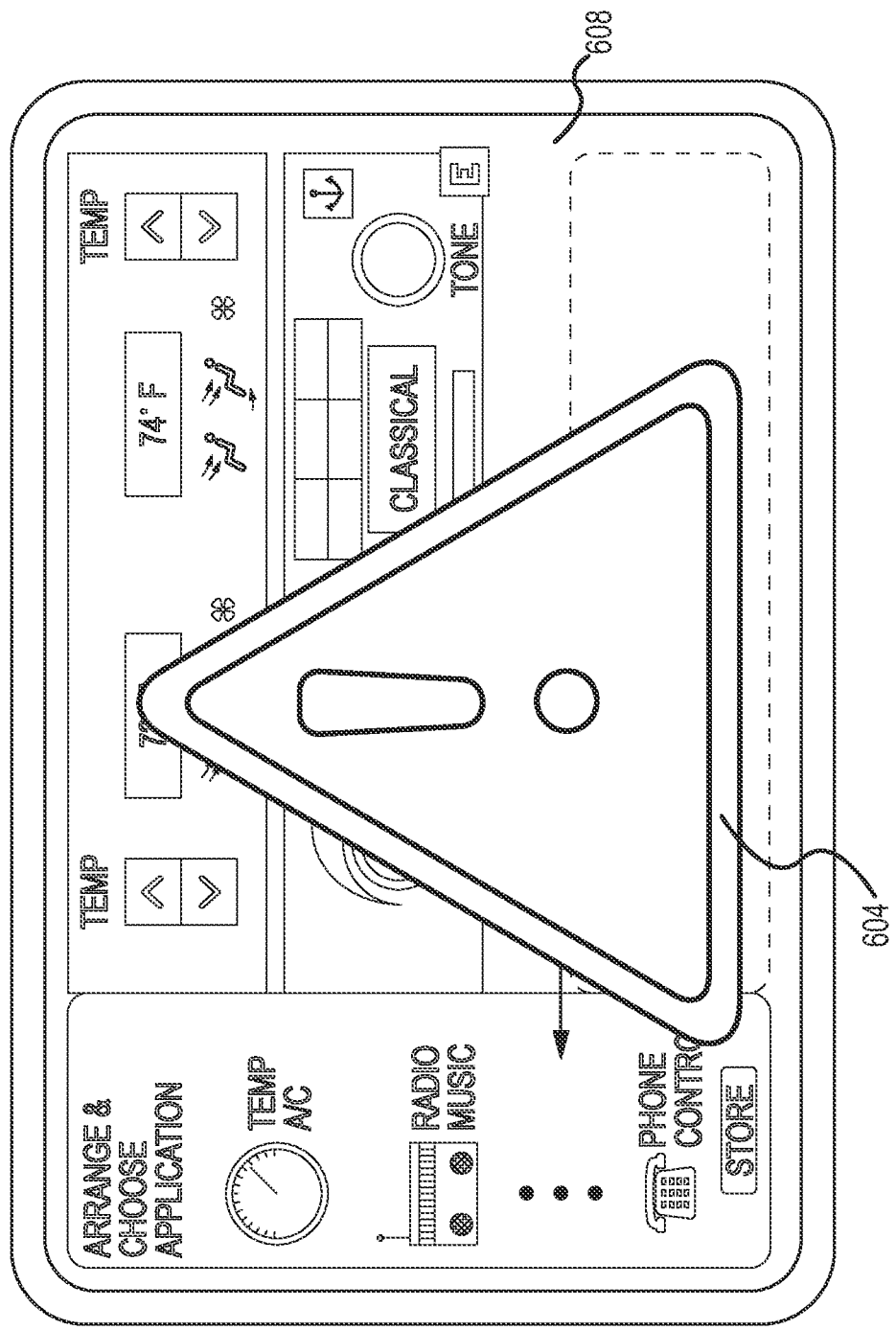

CONFIGURABLE VEHICLE CONSOLE

CROSS REFERENCE TO RELATED APPLICATIONS

The present application claims the benefits of and priority, under 35 U.S.C. §119(e), to U.S. Provisional Application Ser. Nos. 61/560,509, filed on Nov. 16, 2011, entitled "Complete Vehicle Ecosystem"; 61/637,164, filed on Apr. 23, 2012, entitled "Complete Vehicle Ecosystem"; 61/646,747, filed on May 14, 2012, entitled "Branding of Electrically Propelled Vehicles Via the Generation of Specific Operating Sounds"; 61/653,275, filed on May 30, 2012, entitled "Vehicle Application Store for Console"; 61/653,264, filed on May 30, 2012, entitled "Control of Device Features Based on Vehicle State"; 61/653,563, filed on May 31, 2012, entitled "Complete Vehicle Ecosystem"; 61/663,335, filed on Jun. 22, 2012, entitled "Complete Vehicle Ecosystem"; 61/672,483, filed on Jul. 17, 2012, entitled "Vehicle Climate Control"; and 61/714,016, filed on Oct. 15, 2012, entitled "Vehicle Middleware"; and 61/715,699, filed Oct. 18, 2012, entitled "Vehicle Middleware." The entire disclosures of the applications listed above are hereby incorporated by reference, in their entirety, for all that they teach and for all purposes.

This application is also related to U.S. patent application Ser. No. 13/420,236, filed on Mar. 14, 2012, entitled, "Configurable Vehicle Console"; Ser. No. 13/420,240, filed on Mar. 14, 2012, entitled "Removable, Configurable Vehicle Console"; Ser. No. 13/462,593, filed on May 2, 2012, entitled "Configurable Dash Display"; Ser. No. 13/462,596, filed on May 2, 2012, entitled "Configurable Heads-Up Dash Display"; Ser No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,412, filed on Nov. 16, 2012, entitled "Vehicle Application Store for Console"; Ser. No. 13/679,857, filed on Nov. 16, 2012, entitled "Sharing Applications/Media Between Car and Phone (Hydroid)"; Ser. No. 13/679,878, filed on Nov. 16, 2012, entitled "In-Cloud Connection for Car Multimedia"; Ser. No. 13/679,875, filed on Nov. 16, 2012, entitled "Music Streaming"; Ser. No. 13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,699, filed on Nov. 16, 2012, entitled "Etiquette Suggestion"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,441, filed on Nov. 16, 2012, entitled "Universal Bus in the Car"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No. 13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/679,443, filed on Nov. 16, 2012, entitled "Method and System for Maintaining and Reporting Vehicle Occupant Information"; Ser. No. 13/678,762, filed on Nov. 16, 2012, entitled "Behavioral Tracking and Vehicle Applications"; Ser. No. 13/679,292, filed Nov. 16, 2012, entitled "Branding of Electrically Propelled Vehicles Via the Generation of Specific Operating Output"; Ser. No. 13/679,400, filed Nov. 16, 2012, entitled "Vehicle Climate Control"; Ser. No. 13/840,240, filed on Mar. 15, 2013, entitled "Improvements to Controller Area Network Bus"; Ser. No. 13/678,773, filed on Nov. 16, 2012, entitled "Location Information Exchange Between Vehicle and Device"; Ser. No. 13/679,887, filed on Nov. 16, 2012, entitled "In Car Communication Between Devices"; Ser. No. 13/679,842, filed on Nov. 16, 2012, entitled "Configurable Hardware Unit for Car Systems"; Ser. No. 13/679,204, filed on Nov. 16, 2012, entitled "Feature Recognition for Configuring a Vehicle Console and Associated Devices"; Ser. No. 13/679,358, filed on Nov. 16, 2012, entitled "Configurable Dash Display"; Ser. No. 13/679,363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

BACKGROUND

Whether using private, commercial, or public transport, the movement of people and/or cargo has become a major industry. In today's interconnected world, daily travel is essential to engaging in commerce. Commuting to and from work can account for a large portion of a traveler's day. As a result, vehicle manufacturers have begun to focus on making this commute, and other journeys, more enjoyable.

Currently, vehicle manufacturers attempt to entice travelers to use a specific conveyance based on any number of features. Most of these features focus on vehicle safety, or efficiency. From the addition of safety-restraints, air-bags, and warning systems to more efficient engines, motors, and designs, the vehicle industry has worked to appease the supposed needs of the traveler. Recently, however, vehicle manufactures have shifted their focus to user and passenger comfort as a primary concern. Making an individual more comfortable while traveling instills confidence and pleasure in using a given vehicle, increasing an individual's preference for a given manufacturer and/or vehicle type.

One way to instill comfort in a vehicle is to create an environment within the vehicle similar to that of an individual's home or place of comfort. Integrating features in a vehicle that are associated with comfort found in an individual's home can ease a traveler's transition from home to vehicle. Several manufacturers have added comfort features in vehicles such as the following: leather seats, adaptive and/or personal climate control systems, music and media players, ergonomic controls, and in some cases Internet connectivity. However, because these manufacturers have added features to a conveyance, they have built comfort around a vehicle and failed to build a vehicle around comfort.

SUMMARY

There is a need for a vehicle ecosystem that can integrate both physical and mental comforts while seamlessly operating with current electronic devices to result in a totally intuitive and immersive user experience. These and other needs are addressed by the various aspects, embodiments, and/or configurations of the present disclosure. Also, while the disclosure is presented in terms of exemplary embodiments, it should be appreciated that individual aspects of the disclosure can be separately claimed.

In embodiments, a method of configuring a vehicle control system graphical user interface ("GUI") to display a plurality of vehicle applications, comprising: displaying, at a first time, a plurality of applications in a first presentation layout on at least a first GUI, wherein the plurality of applications are configured to communicate with at least one vehicle function associated with each application; receiving a first input at the at least a first GUI, wherein the first input corresponds to an instruction to alter the first presentation layout to a second presentation layout, wherein the first presentation layout corresponds to a first position and behavior of each application of the displayed plurality of applications on the at least a first GUI and the second presentation layout corresponds to a second position and behavior of each application different from the first presentation layout; selecting, by a processor, the second presentation layout to display on the at least a first GUI; sending, by a processor, a command to display the second presentation layout on the at least a first GUI; and displaying, at a second time, the second presentation layout on the at least a first GUI.

A non-transitory computer readable medium having instructions stored thereon that, when executed by a processor, perform the method comprising: displaying, at a first time, a plurality of applications in a first presentation layout on at least a first GUI, wherein the plurality of applications are configured to communicate with at least one vehicle function associated with each application; receiving a first input at the at least a first GUI, wherein the first input corresponds to an instruction to alter the first presentation layout to a second presentation layout, wherein the first presentation layout corresponds to a first position and behavior of each application of the displayed plurality of applications on the at least a first GUI and the second presentation layout corresponds to a second position and behavior of each application different from the first presentation layout; selecting, by a processor, the second presentation layout to display on the at least a first GUI; sending, by a processor, a command to display the second presentation layout on the at least a first GUI; and displaying, at a second time, the second presentation layout on the at least a first GUI.

A device for configuring a vehicle control system graphical user interface ("GUI") to display a plurality of vehicle applications, comprising: a first GUI including a first display area; a first input gesture area of the first display; a vehicle signal input/output port, wherein the vehicle signal input/output port is configured to receive and send signals to and from a plurality of vehicle controls; a non-transitory computer readable medium having instructions stored thereon that, when executed by a processor, perform the method comprising: displaying, at a first time, a plurality of applications in a first presentation layout on the first GUI, wherein the plurality of applications are configured to communicate with vehicle functions that are associated with each application; receiving a first input at the first GUI, wherein the first input corresponds to an instruction to alter the first presentation layout to a second presentation layout, wherein the first presentation layout corresponds to a first position and behavior of each application of the displayed plurality of applications on the first GUI and the second presentation layout corresponds to a second position and behavior of each application different from the first presentation layout; selecting, by a processor, the second presentation layout to display on the first GUI; sending, by a processor, a command to display the second presentation layout on the first GUI; and displaying, at a second time, the second presentation layout on the first GUI.

The present disclosure can provide a number of advantages depending on the particular aspect, embodiment, and/or configuration. Currently, vehicle consoles are known to include physical and/or electrical controls for the manipulation of certain vehicle features. For example, vehicles may include climate control, audio control, and other preferences available from a main console. The adjustment of these controls may be achieved through physical and/or touch-screen manipulation of dials, knobs, switches, keys, buttons, and the like. However, the custom configurability of these controls is limited on current touch-screen consoles and virtually impossible on physical consoles. Moreover, both touch-screen and physical consoles remain permanently hard-wired to the vehicle.

In one embodiment of the present disclosure a removable console is described. Specifically, the present disclosure is directed to a console that can be simply and repeatably detached from and reattached to a specific location. In some cases, a console of a vehicle may span across, or be separated into, one or more individual screens. The present disclosure anticipates detaching at least one of these console screens. This detachable console screen may have its own processor, memory, and power source. Furthermore, the detachable console screen may be operated as a tablet or portable computing platform. Alternatively, the device may be tethered to the vehicle for use inside a predefined area.

In some embodiments, the removable console may interface with the vehicle, and/or other consoles, via an attachment point. The attachment point may include an electrical interface and a locking feature. This locking feature may allow removal and/or prevent removal of the detachable console based on specific rules. Furthermore, the locking feature may be configured to provide a rest portion where the detachable console may reside during a connected operation with the vehicle.

It is one aspect of the present disclosure the removable console may provide its location to the vehicle and/or other associated device. For instance, if the removable console is removed from an area adjacent to the vehicle, an alert may indicate its removal from the predefined area. This alert may be sent to a mobile device (e.g., text message). Additionally, the alert may be an audible and/or visual alert to those adjacent to the vehicle. Moreover, the removable console may provide a signal that can be analyzed to determine location. This signal may be continuously and/or selectively sent according to specific rules.

In another embodiment of the present disclosure, a configurable console is shown to incorporate various features and controls that may be selectively configured by an application, user, software, hardware, various input, and the like. Configuration may include adjustments to at least one of the size, location, available features, functions, applications, modules, and behavior of the configurable console. It is one aspect of the present disclosure to allow for the integration of custom designed templates of standard console layouts that users may manipulate and/or modify. These modifications may be saved and stored.

Further, certain controls and/or features may be selected to display in any given position on the console. For example, if a user wishes to have constant access to the climate-control settings of a vehicle, the user may place a "climate-control" module on the configurable console. The position and/or features of this module may be adjusted according to rules and its position may be arranged as desired by the user. It is anticipated that recommended positions for the module, or modules, could be provided by the vehicle console system. If a user wishes to add a "music control" module to the console the user can similarly select position, size, and/or other features associated with the module to best suit the user's needs. A user may access a respective or selected console display configuration from among a plurality of different console display configurations by inputting a code or identifier. The result is that different users of a common vehicle or common make, year, and model can have differently configured console displays.

In some embodiments, these modules may be programmed to disappear, dim, or exhibit other functions in response to some type of stimulus. For example, the user may want one or more control modules to dim upon driving. Alternatively, the user may want one or more modules to disappear according to a timer or other stimulus. It is anticipated that the stimulus may include user input, timers, sensors, programmed conditions, and the like.

For example, in the event of an accident, access to a vehicle's music, climate control and/or other non-essential modules is of little benefit. In an emergency scenario, the console may use one or more sensors, possibly including vehicle sensor (e.g., air bag sensor, gyroscope, or accelerometer), to detect the accident and provide emergency features to a user via the console. These features may replace the standard modules arranged on the console (e.g., the music and climate modules are minimized or removed, replaced by one or more emergency modules). A large "hazard" light module may be created. Additionally or alternatively, an emergency contact module may be provided to allow the user easy access to an emergency communication channel. Contacting the emergency channel could be left to the discretion of the user. As can be appreciated by one skilled in the art, these emergency modules may automatically contact an emergency channel and/or use timers and other sensors to determine whether to initiate contact with the emergency channel.

In accordance with the present disclosure, it is anticipated that the vehicle may use sensors in an individual's phone or other device to detect a specific user's heartbeat and/or monitor a user's other vital signs. These vital signs could be relayed to an emergency contact to aid in possible treatment and/or evaluate a necessary emergency response. Using a phone's, or other device's, gyroscope and/or accelerometer to detect a user's heartbeat could be achieved via storing conditions at a time prior to an accident and comparing the stored conditions to those obtained during the emergency. In the event that a user has associated his or her phone and/or device with the vehicle console, this process of monitoring, sending, and using the vital sign information could be achieved automatically by the console and/or vehicle. These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "desktop" refers to a metaphor used to portray systems. A desktop is generally considered a "surface" that typically includes pictures, called icons, widgets, folders, etc. that can activate show applications, windows, cabinets, files, folders, documents, and other graphical items. The icons are generally selectable to initiate a task through user interface interaction to allow a user to execute applications or conduct other operations.

The term "display" refers to a portion of a screen used to display the output of a computer to a user.

The term "displayed image" refers to an image produced on the display. A typical displayed image is a window or desktop. The displayed image may occupy all or a portion of the display.

The term "display orientation" refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical. The multi-screen display can have one composite display that encompasses all the screens. The composite display can have different display characteristics based on the various orientations of the device.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "module" as used herein refers to any known or later developed hardware, software, firmware, artificial intelligence, fuzzy logic, or combination of hardware and software that is capable of performing the functionality associated with that element.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area.

A "multi-screen application" refers to an application that is capable of producing one or more windows that may simultaneously occupy multiple screens. A multi-screen application commonly can operate in single-screen mode in which one or more windows of the application are displayed only on one screen or in multi-screen mode in which one or more windows are displayed simultaneously on multiple screens.

A "single-screen application" refers to an application that is capable of producing one or more windows that may occupy only a single screen at a time.

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "window" refers to a, typically rectangular, displayed image on at least part of a display that contains or provides content different from the rest of the screen. The window may obscure the desktop.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 5A depicts a first representation of a graphical user interface of a configurable vehicle console in accordance with one embodiment of the present disclosure;

FIG. 5D depicts a fourth representation of a graphical user interface of a configurable vehicle console in accordance with one embodiment of the present disclosure;

FIG. 6A depicts a sixth representation of a graphical user interface of a configurable vehicle console in accordance with one embodiment of the present disclosure;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can comprise single devices or a compilation of devices. Furthermore, the device can be a communications device, such as a cellular telephone, or other smart device. This device, or devices, may be capable of communicating with other devices and/or to an individual or group of individuals. Further, this device, or these devices, can receive user input in unique ways. The overall design and functionality of each device provides for an enhanced user experience making the device more useful and more efficient. As described herein, the device(s) may be electrical, mechanical, electro-mechanical, software-based, and/or combinations thereof.

Figure 1:
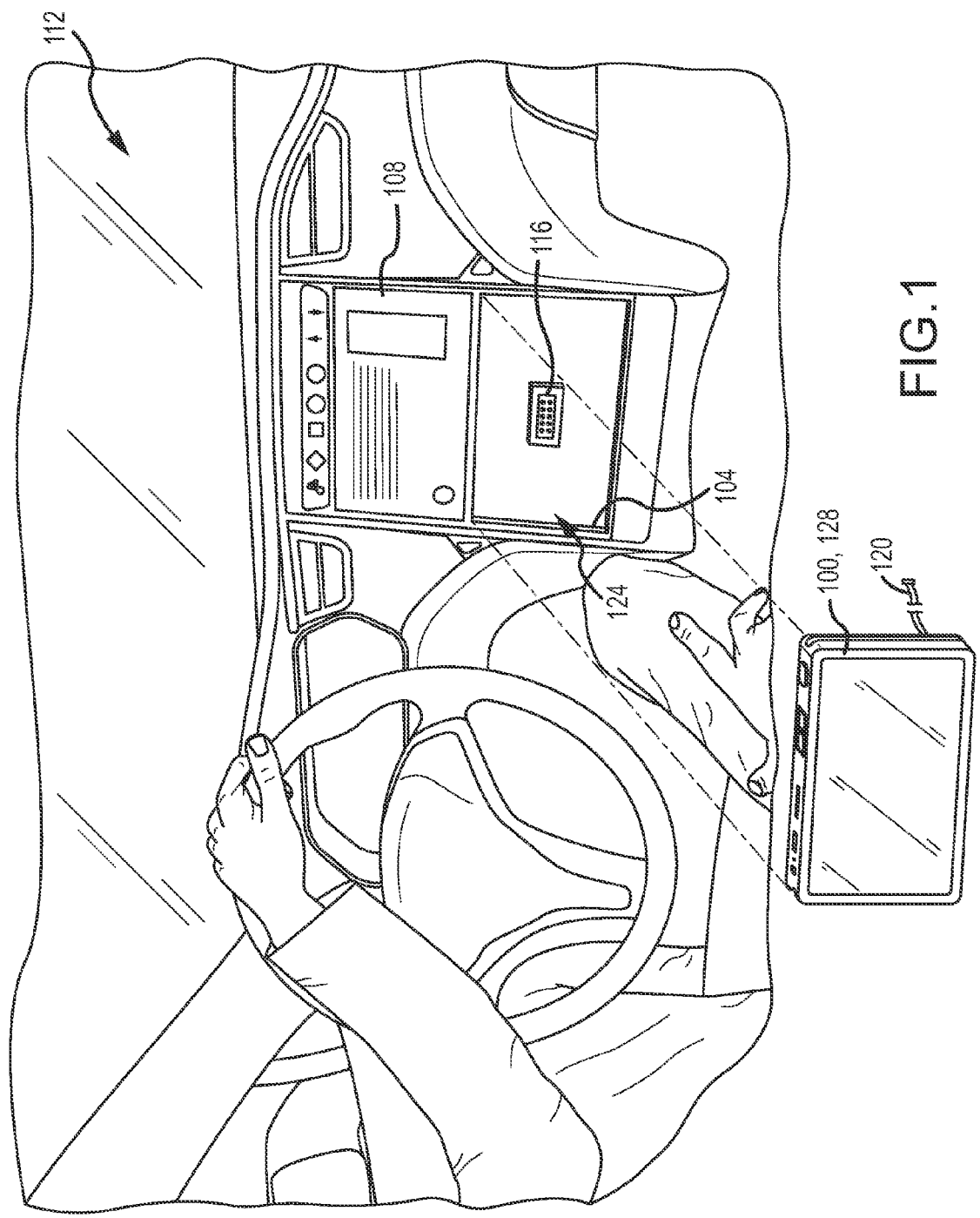
FIG. 1 depicts a device of a configurable vehicle console removably detached from a mounting location of a vehicle in accordance with one embodiment of the present disclosure.

FIG. 1 depicts a device of a configurable vehicle console removably detached from a mounting location of a vehicle in accordance with one embodiment of the present disclosure. In some embodiments, the configurable vehicle console may comprise at least one device 100 that is capable of being attached to a vehicle in a vehicle-mounted position 124. Further, the device 100 may engage with the vehicle via one or more of engagement feature 212 (FIGS. 2A and 2B), vehicle mount 104, vehicle dock 116, and combinations thereof. In embodiments, the configurable vehicle console may consist of the device 100 and at least one additional console display 108. Moreover, the device 100 may be tethered to the vehicle-mount position via an optional tether 120. As can be appreciated, the tether 120 may carry electrical and/or optical signals for the purposes of power and communication. The tether 120 may be connected between the device 100 and the vehicle interior 112, and even connect to the dock 116. In some embodiments, the tether 120 may be used to limit movement of the device 100, especially acting such that the device 100 may not be removed from the vehicle interior 112. Further, the tether 120 may be constructed from a material, or combination of materials, that allow the device 100 to be repeatably attached and detached from the vehicle-mounted position 124. In an alternative embodiment, the tether 120 may be constructed such that no signal, power or otherwise, is passed from the device 100 to the vehicle.

It is anticipated that the device 100 may communicate with, and/or be operated independently of, the additional console display 108. Communication between the device 100 and the additional console display 108 may be achieved through physical and/or wireless methods. It is one aspect of the present disclosure that the device 100 when removed from the vehicle-mounted position 124 may be operated as a stand-alone computing device 128, such as a tablet computer. This stand-alone computing device 128 may also display and behave as a tablet computer configured as, but in no way limited to, email clients, web browsers, texting applications, games, media players, office suites, etc. In embodiments, applications that have been designated as "essential" may either remain on the display of the stand-alone computing device 128 or upon removal be transferred to the additional console display 108. This transfer of the essential applications may be initiated by a manually selected option. Alternatively, the transfer of essential applications may be initiated automatically when the device 100 is removed from the vehicle-mounted position 124. One or more of a number of sensors, the mount 104, the dock 116, other features of the device 100, and combinations thereof may be used to determine removal of the device 100 from the vehicle-mounted position 124.

Figure 2A:
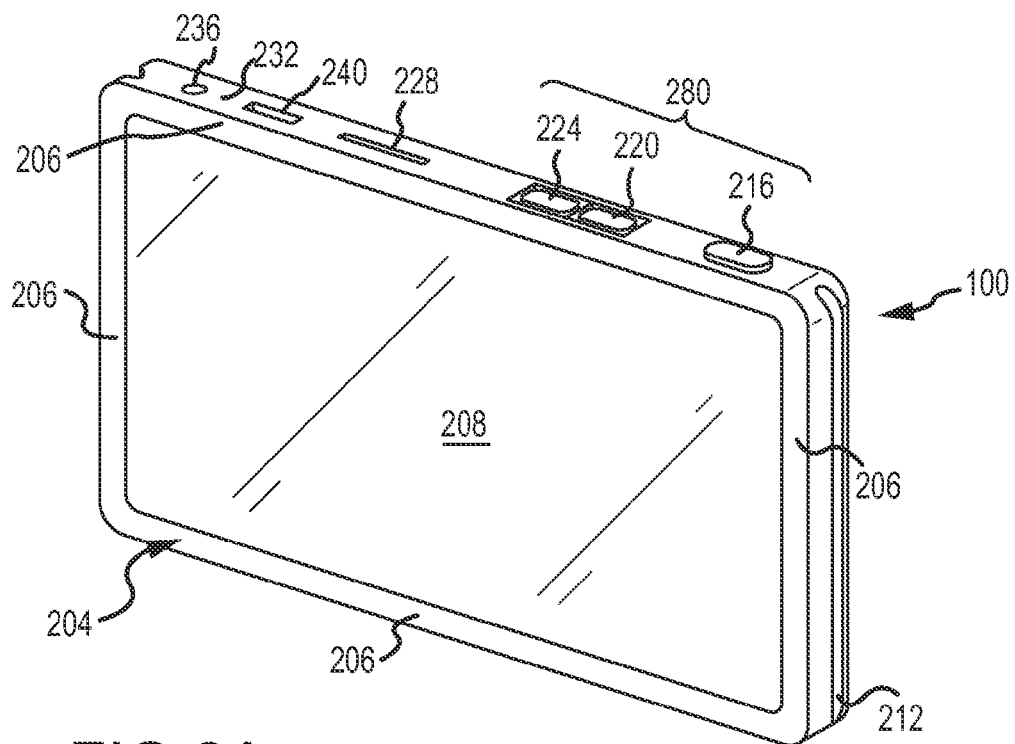
FIG. 2A depicts a front perspective view of a configurable vehicle console in accordance with one embodiment of the present disclosure.
Figure 2B:
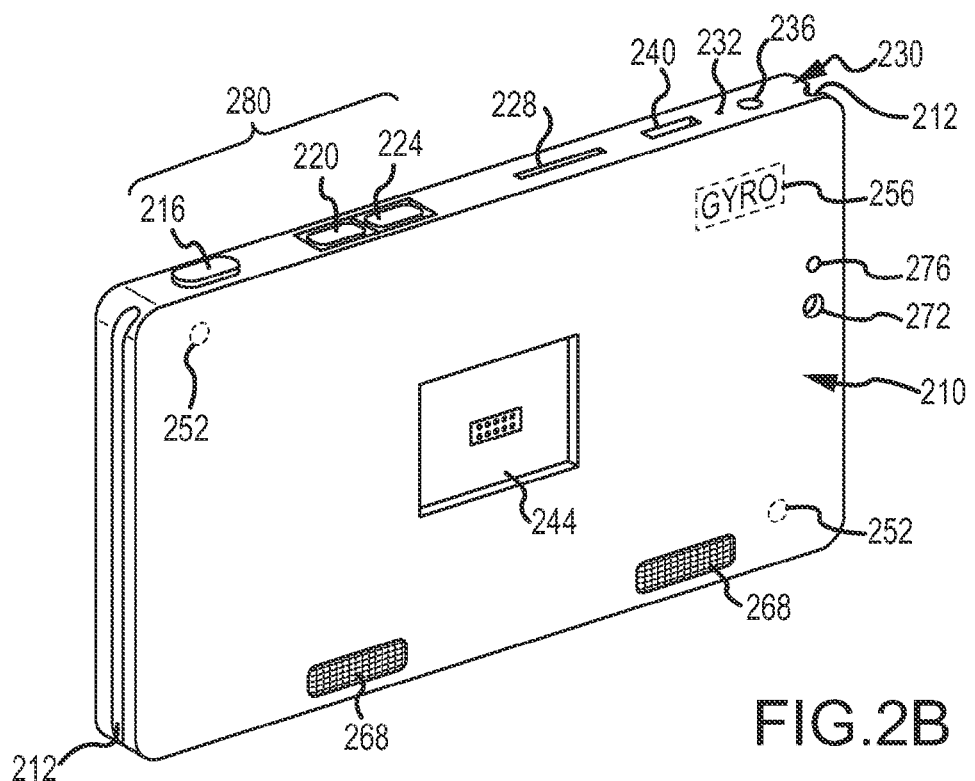
FIG. 2B depicts a rear perspective view of a configurable vehicle console in accordance with one embodiment of the present disclosure.

FIGS. 2A and 2B illustrate a device in accordance with embodiments of the present disclosure. The configurable vehicle console can include a number of devices that work together with at least one process of a vehicle to provide various input/output functions. One such device 100 includes a touch sensitive front screen 204. In some embodiments, the entire front surface of the front screen 204 may be touch sensitive and capable of receiving input by a user touching the front surface of the front screen 204. The front screen 204 includes touch sensitive display 208, which, in addition to being touch sensitive, also displays information to a user. In other embodiments, the screen 204 may include more than one display area.

It is anticipated that the device 100 may comprise a dual-screen phone and/or smartpad as described in respective U.S. patent application Ser. No. 13/222,921, filed Aug. 31, 2011, entitled "DESKTOP REVEAL EXPANSION," and Ser. No. 13/247,581, filed Sep. 28, 2011, entitled "SMARTPAD ORIENTATION." Each of the aforementioned documents is incorporated herein by this reference in their entirety for all that they teach and for all purposes.

In addition to touch sensing, front screen 204 may also include areas that receive input from a user without requiring the user to touch the display area of the screen. For example, the front screen 204 may be configured to display content to the touch sensitive display 208, while at least one other area may be configured to receive touch input via a gesture capture area 206. The front screen 204 includes at least one gesture capture area 206. This at least one gesture capture area 206 is able to receive input by recognizing gestures made by a user touching the gesture capture area surface of the front screen 204. In comparison to the touch sensitive display 208, the gesture capture area 206 is commonly not capable of rendering a displayed image.

Also shown in FIGS. 2A and 2B is at least one engagement feature 212 that is configured to facilitate the removable attachment and detachment of the device 100 from a vehicle-mounted position. The vehicle-mounted position refers to the location of the device 100 when it is attached to the vehicle console, the vehicle, and/or vehicle accessory. Although still capable of operating as a configurable vehicle console when detached, the vehicle-mounted position allows the device 100 to operate in a state that may differ from another state when the device 100 is detached. The engagement feature 212 may employ the use of grooves, catches, hollows, clasps, tab and slot, protrusions, bosses, combinations thereof, and/or other mechanical or electromechanical features to enable attachment to a vehicle-mounted position. It is anticipated that the engagement feature 212 will further provide for the secure mounting to a vehicle and/or accessory while also providing access to the quick removal of the device 100 from its vehicle-mounted position.

In some embodiments, the device 100 may include one or more physical and/or electrical features such as switches, buttons, ports, slots, inputs, outputs, and the like. These features may be located on one or more surfaces 230 of the console 100. In embodiments, several of these features may be accessed when detached from a default vehicle-mounted location. In other words, it is an aspect of the present disclosure to locate one or more of these features on a surface of the device 100 that remains hidden when attached.

FIGS. 2A and 2B show a top side 230 of the console 100. As shown, the top side 230 of the device 100 in one embodiment may include a plurality of control buttons 280, which can be configured for specific inputs and, in response to receiving an input, may provide one or more electrical signals to a specific input pin of a processor or Integrated Circuit (IC) in the device 100. For example, control buttons 216, 220, and 224 may be configured to, in combination or alone, control a number of aspects of the device 100. Some non-limiting examples include overall system power, volume, brightness, vibration, selection of displayed items, a camera, a microphone, and initiation/termination of device functions. In some embodiments, instead of separate buttons two buttons may be combined into a rocker button. This arrangement is useful in situations where the buttons are configured to control features such as volume or brightness. In other embodiments, button 216 is configured to, in addition to or in lieu of controlling system power, control other aspects of the device 100. In some embodiments, one or more of the buttons 180 are capable of supporting different user commands. By way of example, a normal press has a duration commonly of less than about 1 second and resembles a quick tap. A medium press has a duration commonly of 1 second or more but less than about 12 seconds. A long press has a duration commonly of about 12 seconds or more. The function of the buttons is normally specific to the application that is currently in focus on the respective display 208. In a communications application for instance and depending on the particular button, a normal, medium, or long press can mean end communication, increase volume of communication, decrease volume of communication, and toggle microphone mute. In a camera or video application for instance and depending on the particular button, a normal, medium, or long press can mean increase zoom, decrease zoom, and take photograph or record video.

As shown in FIGS. 2A and 2B, the device 100 may also include a card/memory slot 228 and a port 240 on its side 230. The card/memory slot 228, in embodiments, accommodates different types of cards including a subscriber identity module (SIM) and/or other card based memory. Port 240 in embodiments is an input/output (I/O port) that allows the device 100 to be connected to other peripheral devices, such as a vehicle, phone, keyboard, other display, and/or printing device. As can be appreciated, these are merely some examples and in other embodiments the device 100 may include other slots and ports such as slots and ports for accommodating additional memory devices, facilitating firmware and/or software updates, and/or for connecting other peripheral devices. Also shown in FIGS. 2A and 2B is an audio jack 236 that accommodates a tip, ring, sleeve (TRS) connector for example to allow a user to utilize headphones or a headset.

There are also a number of hardware components with the device 100. As illustrated in FIG. 2B, device 100 includes a speaker 268 and a microphone 232. The microphone 232 may be used by the device 100 to receive audio input which may control and/or manipulate applications and/or features of the device 100. In embodiments, device 100 also includes a camera 272 and a light source 276, which may be used to control and/or manipulate applications and/or features of the device 100. It is anticipated that the device 100 may include one or more cameras 272 which can be mounted on any of the surfaces shown in the accompanying figures. In the event that the one or more cameras are used to detect user input, via gestures and/or facial expression, the one or more cameras may be located on the front screen 204. The front screen 204 is shown in FIG. 2A. Additionally, the device 100 includes one or more magnetic sensing feature 252 that, when located in the vehicle-mounted position, provides indication of the engagement position. As can be appreciated, when the device 100 is removed from a vehicle-mounted position the one or more magnetic sensing feature 252 provide the ability to detect the corresponding detachment of the device 100. This sensing may be determined at the device 100, the console, and/or the vehicle itself. An accelerometer and/or gyroscope 256 may also be included as part of the device 100 to determine, among other things, the orientation of the device 100 and/or the orientation of the screen 204.

Referring to FIG. 2B the console rear 210 is shown in perspective view along with several electrical and mechanical features in accordance with embodiments of the present disclosure. Device 100 includes an electrical and communications connection or docking port 244 that is capable of interfacing with one or more other devices, including a vehicle control system. These other devices may include additional displays, consoles, dashboards, associated vehicle processors, and the like. The docking port 244 is capable of transferring power from other devices to the device 100. Moreover, vehicle and/or functional communications may be made through the docking port 244. Communication may involve sending and receiving one or more signals between a vehicle and the device 100. It is anticipated that when the device 100 is in a vehicle-mounted position the device 100 will be docked via the docking port 244. The connection from the device 100 to at least one other device may be made through the docking port 244 via a physical, inductive, and/or wireless association. It is anticipated that the docking port 244 may incorporate features similar, if not identical, to those described above as engagement feature 212. These features may further allow physical connection to a vehicle mount and/or vehicle. Furthermore, the docking port may provide a physical connection in addition to or apart from the engagement feature 212 previously described.

As can be appreciated, the description of the device 100 is made for illustrative purposes only, and the embodiments are not limited to the specific mechanical features shown in FIGS. 2A-2B and described above. In other embodiments, the device 100 may include additional features, including one or more additional buttons, slots, display areas, and/or locking mechanisms. Additionally, in embodiments, the features described above may be located in different parts of the device 100 and still provide similar functionality. Therefore, FIGS. 2A-2B and the description provided above are non-limiting.

Figure 3:
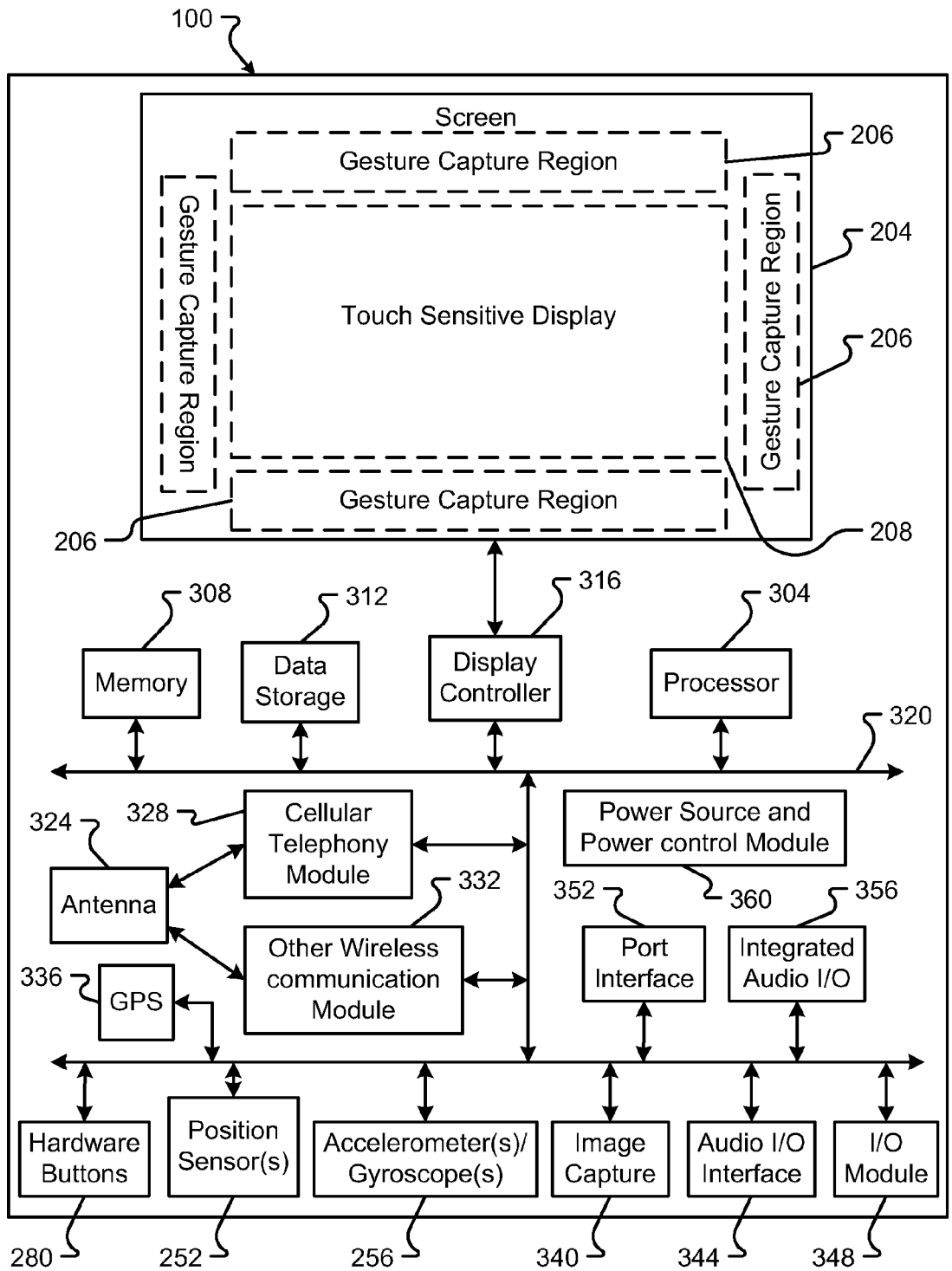
FIG. 3 is a block diagram of an embodiment of the hardware of the device.

FIG. 3 illustrates components of a device 100 in accordance with embodiments of the present disclosure. In general, the device 100 includes a front screen 204 with a touch sensitive display 208. The front screen 204 may be disabled and/or enabled by a suitable command. Moreover, the front screen 204 can be touch sensitive and can include different operative areas. For example, a first operative area, within the touch sensitive screen 204, may comprise a touch sensitive display 208. In general, the touch sensitive display 208 may comprise a full color, touch sensitive display. A second area within each touch sensitive screen 204 may comprise a gesture capture region 206. The gesture capture region 206 may comprise one or more area or region that is outside of the touch sensitive display 208 area, and that is capable of receiving input, for example in the form of gestures provided by a user. However, the one or more gesture capture regions 206 do not include pixels that can perform a display function or capability.

It is further anticipated that a third region of the touch sensitive screen 204 may comprise one or more configurable areas. The configurable area is capable of receiving input and has display or limited display capabilities. As can be appreciated, the configurable area may occupy any part of the touch sensitive screen 204 not allocated to a gesture capture region 206 or touch sensitive display 208. In embodiments, the configurable area may present different input options to the user. For example, the configurable area may display buttons or other relatable items. Moreover, the identity of displayed buttons, or whether any buttons are displayed at all within the configurable area of the touch sensitive screen 204 may be determined from the context in which the device 100 is used and/or operated. In an exemplary embodiment, the touch sensitive screen 204 comprises liquid crystal display devices extending across at least the region of the touch sensitive screen 204 that is capable of providing visual output to a user, and a resistive and/or capacitive input matrix over the regions of the touch sensitive screen 204 that are capable of receiving input from the user.

One or more display controllers 316 may be provided for controlling the operation of the touch sensitive screen 204, including input (touch sensing) and output (display) functions. In the exemplary embodiment illustrated in FIG. 3, a touch screen controller 316 is provided for the touch screen 204. In accordance with some embodiments, the functions of a touch screen controller 316 may be incorporated into other components, such as a processor 304.

The processor 304 may comprise a general purpose programmable processor or controller for executing application programming or instructions. In accordance with at least some embodiments, the processor 304 may include multiple processor cores, and/or implement multiple virtual processors. In accordance with still other embodiments, the processor 304 may include multiple physical processors. As a particular example, the processor 304 may comprise a specially configured application specific integrated circuit (ASIC) or other integrated circuit, a digital signal processor, a controller, a hardwired electronic or logic circuit, a programmable logic device or gate array, a special purpose computer, or the like. The processor 304 generally functions to run programming code or instructions implementing various functions of the device 100.

A device 100 may also include memory 308 for use in connection with the execution of application programming or instructions by the processor 304, and for the temporary or long term storage of program instructions and/or data. As examples, the memory 308 may comprise RAM, DRAM, SDRAM, or other solid state memory. Alternatively or in addition, data storage 312 may be provided. Like the memory 308, the data storage 312 may comprise a solid state memory device or devices. Alternatively or in addition, the data storage 312 may comprise a hard disk drive or other random access memory.

In support of communications functions or capabilities, the device 100 can include a cellular telephony module 328. As examples, the cellular telephony module 328 can comprise a GSM, CDMA, FDMA and/or analog cellular telephony transceiver capable of supporting voice, multimedia and/or data transfers over a cellular network. Alternatively or in addition, the device 100 can include an additional or other wireless communications module 332. As examples, the other wireless communications module 332 can comprise a Wi-Fi, BLUETOOTH™, WiMax, infrared, or other wireless communications link. The cellular telephony module 328 and the other wireless communications module 332 can each be associated with a shared or a dedicated antenna 324.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 244 and/or port interface 352 can support the supply of power to or from the device 100. The port interface 352 also comprises an intelligent element that comprises a docking module for controlling communications or other interactions between the device 100 and a connected device or component.

An input/output module 348 and associated ports may be included to support communications over wired networks or links, for example with other communication devices, server devices, and/or peripheral devices. Examples of an input/output module 248 include an Ethernet port, a Universal Serial Bus (USB) port, Institute of Electrical and Electronics Engineers (IEEE) 1394, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog to digital converter. Alternatively or in addition, the device 100 can include an integrated audio input/output device 356 and/or an audio jack for interconnecting an external speaker or microphone. For example, an integrated speaker and an integrated microphone can be provided, to support near talk or speaker phone operations.

Hardware buttons 280 can be included for example for use in connection with certain control operations. Examples include a master power switch, volume control, etc., as described in conjunction with FIGS. 2A and 2B. One or more image capture interfaces/devices 340, such as a camera 272, can be included for capturing still and/or video images. Alternatively or in addition, an image capture interface/device 340 can include a scanner or code reader. An image capture interface/device 340 can include or be associated with additional elements, such as a flash or other light source 276.

The device 100 can also include a global positioning system (GPS) receiver 336. In accordance with embodiments of the present invention, the GPS receiver 336 may further comprise a GPS module that is capable of providing absolute location information to other components of the device 100. An accelerometer(s)/gyroscope(s) 256 may also be included. For example, in connection with the display of information to a user and/or other functions, a signal from the accelerometer/gyroscope 256 can be used to determine an orientation and/or format in which to display that information to the user. In some embodiments, the accelerometer/gyroscope 256 may comprise at least one accelerometer and at least one gyroscope.

Embodiments of the present invention can also include one or more magnetic sensing feature 252. The magnetic sensing feature 252 can be configured to provide a signal indicating the position of the device relative to a vehicle-mounted position. This information can be provided as an input, for example to a user interface application, to determine an operating mode, characteristics of the touch sensitive display 208 and/or other device 100 operations. As examples, a magnetic sensing feature 252 can comprise one or more of Hall-effect sensors, a multiple position switch, an optical switch, a Wheatstone bridge, a potentiometer, or other arrangement capable of providing a signal indicating of multiple relative positions the touch screens are in. Alternatively, the magnetic sensing feature 252 may comprise one or more metallic elements used by other sensors associated with the console and/or vehicle to determine whether the device 100 is in a vehicle-mounted position. These metallic elements may include but are not limited to rare-earth magnets, electromagnets, ferrite and/or ferrite alloys, and/or other material capable of being detected by a range of sensors.

Communications between various components of the device 100 can be carried by one or more buses 322. In addition, power can be supplied to the components of the device 100 from a power source and/or power control module 360. The power control module 360 can, for example, include a battery, an AC to DC converter, power control logic, and/or ports for interconnecting the device 100 to an external source of power.

Figure 4:
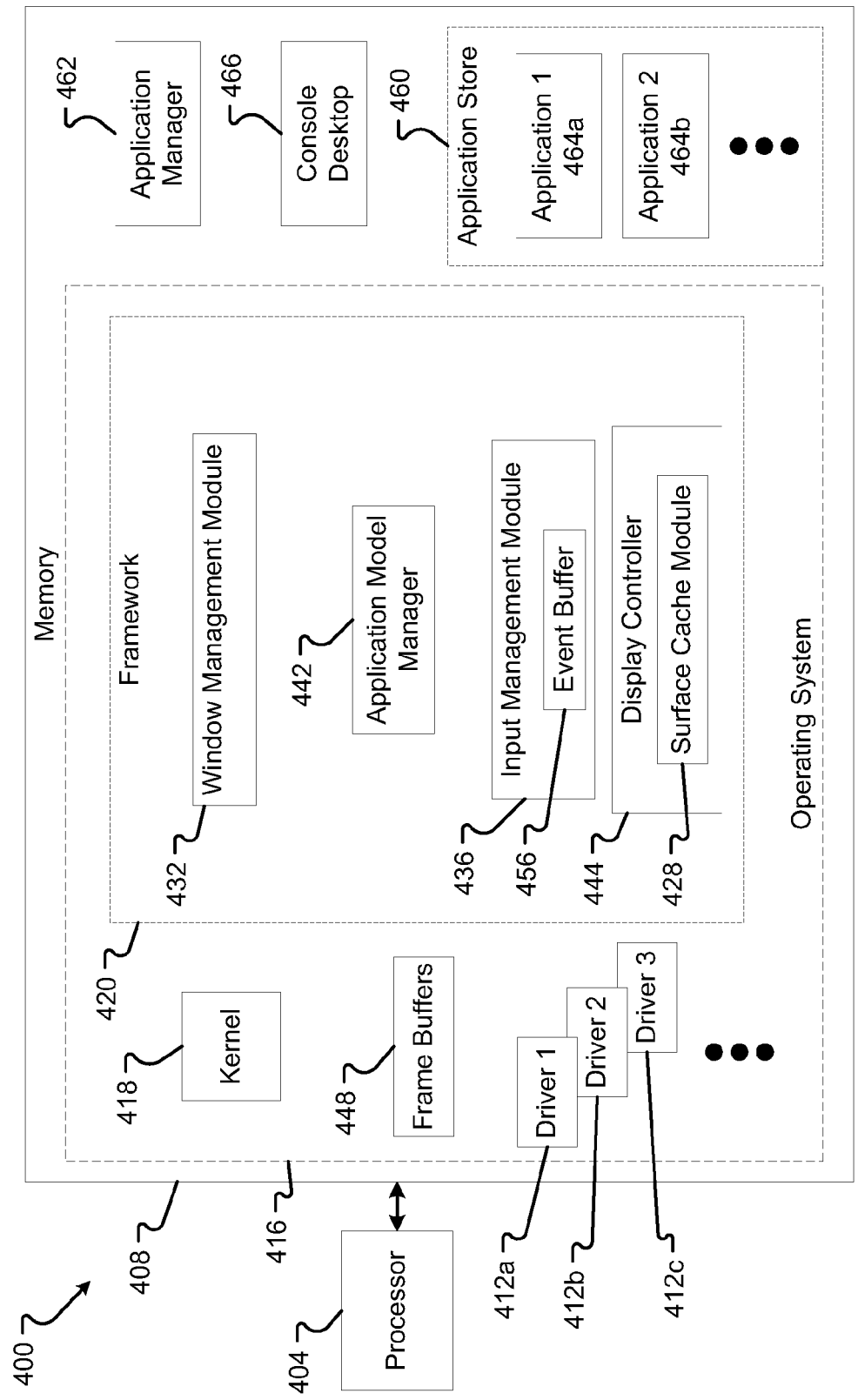
FIG. 4 is a block diagram of an embodiment of the device software and/or firmware.

FIG. 4 depicts a block diagram of an embodiment of the device software and/or firmware. The memory 408 may store and the processor 404 may execute one or more software components. These components can include at least one operating system (OS) 416, an application manager 462, a console desktop 466, and/or one or more applications 464a and/or 464b from an application store 460. The OS 416 can include a framework 420, one or more frame buffers 448, one or more drivers 412, and/or a kernel 418. The OS 416 can be any software, consisting of programs and data, which manages computer hardware resources and provides common services for the execution of various applications 464. The OS 416 can be any operating system and, at least in some embodiments, dedicated to mobile devices, including, but not limited to, Linux, ANDROID™, iPhone OS (IOS™), WINDOWS PHONE 7™, etc. The OS 416 is operable to provide functionality to the device 100 by executing one or more operations, as described herein.

The applications 464 can be any higher level software that executes particular console functionality for the user. Applications 464 can include programs such as vehicle control applications, email clients, web browsers, texting applications, games, media players, office suites, etc. The applications 464 can be stored in an application store 460, which may represent any memory or data storage, and the management software associated therewith, for storing the applications 464. Once executed, the applications 464 may be run in a different area of memory 408.

The framework 420 may be any software or data that allows the multiple tasks running on the device to interact. In embodiments, at least portions of the framework 420 and the discrete components described hereinafter may be considered part of the OS 416 or an application 464. However, these portions will be described as part of the framework 420, but those components are not so limited. The framework 420 can include, but is not limited to, a Surface Cache module 428, a Window Management module 432, an Input Management module 436, an Application Model Manager 442, a Display Controller, one or more frame buffers 448, and/or an event buffer 456.

The Surface Cache module 428 includes any memory or storage and the software associated therewith to store or cache one or more images of applications, windows, and/or console screens. A series of active and/or non-active windows (or other display objects, such as, a desktop display) can be associated with each display. An active window (or other display object) is currently displayed. A non-active window (or other display objects) was opened and, at some time, displayed but are now not displayed. To enhance the user experience, before a window transitions from an active state to an inactive state, a "screen shot" of a last generated image of the window (or other display object) can be stored. The Surface Cache module 428 may be operable to store a bitmap of the last active image of a window (or other display object) not currently displayed. Thus, the Surface Cache module 428 stores the images of non-active windows (or other display objects) in a data store.

In embodiments, the Window Management module 432 is operable to manage the windows (or other display objects) that are active or not active on each of the displays. The Window Management module 432, based on information from the OS 416, or other components, determines when a window (or other display object) is visible or not active. The Window Management module 432 may then put a non-visible window (or other display object) in a "not active state" and, in conjunction with the Task Management module Task Management 440 suspends the application's operation. Further, the Window Management module 432 may assign a display identifier to the window (or other display object) or manage one or more other items of data associated with the window (or other display object). The Window Management module 432 may also provide the stored information to the application 464, or other components interacting with or associated with the window (or other display object). The Window Management module 432 can also associate an input task with a window based on window focus and display coordinates within the motion space.

The Input Management module 436 is operable to manage events that occur with the device. An event is any input into the window environment, for example, a user interface interactions with a user. The Input Management module 436 receives the events and logically stores the events in an event buffer 456. Events can include such user interface interactions as a "down event," which occurs when the screen 204 receives a touch signal from a user, a "move event," which occurs when the screen 204 determines that a user's finger is moving across a screen(s), an "up event, which occurs when the screen 104 determines that the user has stopped touching the screen 204 etc. These events are received, stored, and forwarded to other modules by the Input Management module 436. The Input Management module 436 may also map screen inputs to a motion space which is the culmination of all physical and virtual display available on the device.

The frame buffer 448 is a logical structure(s) used to render the user interface. The frame buffer 448 can be created and destroyed by the OS kernel 418. However, the Display Controller 444 can write the image data, for the visible windows, into the frame buffer 448. A frame buffer 448 can be associated with one screen or multiple screens. The association of a frame buffer 448 with a screen can be controlled dynamically by interaction with the OS kernel 418. A composite display may be created by associating multiple screens with a single frame buffer 448. Graphical data used to render an application's window user interface may then be written to the single frame buffer 448, for the composite display, which is output to the multiple screens 204. The Display Controller 444 can direct an application's user interface to a portion of the frame buffer 448 that is mapped to a particular display 208, thus, displaying the user interface on only one screen 204. The Display Controller 444 can extend the control over user interfaces to multiple applications, controlling the user interfaces for as many displays as are associated with a frame buffer 448 or a portion thereof. This approach compensates for the physical screen 204 and any other console screens that are in use by the software component above the Display Controller 444.

The Application Manager 462 is an application that provides a presentation layer for the window environment. Thus, the Application Manager 462 provides the graphical model for rendering. Likewise, the Desktop 566 provides the presentation layer for the Application Store 460. Thus, the desktop provides a graphical model of a surface having selectable application icons for the Applications 464 in the Application Store 460 that can be provided to the Window Management Module 456 for rendering.

Further, the framework can include an Application Model Manager (AMM) 442. The Application Manager 462 may interface with the AMM 442. In embodiments, the AMM 442 receives state change information from the device 100 regarding the state of applications (which are running or suspended). The AMM 442 can associate bit map images from the Surface Cache Module 428 to the applications that are alive (running or suspended). Further, the AMM 442 may provide a list of executing applications to the Application Manager 462.

FIGS. 5A-5E depict multiple representations of a graphical user interface ("GUI") in accordance with embodiments of the present disclosure. In some embodiments, icons, applications, and/or the presentation layout may be modified via user input and/or automatically via a processor.

FIG. 5A depicts a first representation of a GUI of a device 100 in accordance with embodiments of the present disclosure. In embodiments, the device 100 is adapted to run and/or display one or more applications that are associated with at least one vehicle function. An application may be displayed onto the touch sensitive screen 204. Additionally or alternatively, the device 100 may run an application that is designed to control the climate functions of a vehicle. In this case, the climate control application 512a may display a desired temperature, various control features, and one or more virtual buttons to manipulate the control of the application. A user, via the touch sensitive screen 204, may increase or decrease the temperature, set different climate modes (such as air recirculation, vent, fan settings, and the like) and set preferences of the application itself. In embodiments, the device 100 may receive input from a number of different sources, including physical, electrical, and/or audible commands. Input may be received at the device 100 through, but not limited to, the touch sensitive screen 204, microphone 232, hardware buttons 280, ports 228, 240, 236, and combinations thereof.

Other vehicle applications and their corresponding functions may be run by the device 100, including entertainment applications (music, movies, etc.), trip computer applications (to display mileage traveled, miles per gallon fuel consumption, average speed, etc.), phone controls (especially hands-free phones associated with the vehicle), GPS, road conditions and warnings, and other applications useful to a vehicle operator or passenger. It is anticipated that vehicle applications may be purchased and/or managed via the Application Store 460.

The Application Store 460 may be similar to an application store for smart phones, mobile devices, and computers. It is anticipated that the present disclosure may use a communications channel or multiple channels available to the vehicle to make an application store purchase and/or download. Moreover, this purchase and download could be effected through the use of at least one individual's phone associated with the vehicle. In some embodiments, the application store may manage one or more applications remotely. This remote management may be achieved on the "cloud," possibly as part of a cloud-based storage medium.

It should be noted that the processing resources required for running, or at least displaying, applications on the device 100 may be split between processors that are associated with the device 100 and processors that are not associated with the device 100.

In some embodiments, applications 512a, 512b, 512n may include features that allow for custom and/or predefined functionality. This functionality may be associated with the behavior, appearance, and/or operating capability of one or more applications. For example, an application may include a position anchor icon 528 that, when selected, fixes the application to a location on the display 208. Fixing one or more applications in this manner may allow for the custom positioning of other non-fixed applications around the one or more applications that have been anchored. Moreover, applications and/or icons may be moved and positioned in various locations on the front screen 204. For instance, an application may be resized via control handles 540, 536 which may be present on one or more applications. Applications may be relocated and/or positioned in the presentation layout according to various user input 532.

Additionally or alternatively, applications may be associated with an icon that indicates whether an application is considered essential to vehicle operation. This essential application icon 524, may be selected to designate an application as important to the user and/or vehicle. For example, in the event that an application is configured to display warnings associated with specific states of vehicle operation, the user and/or the device 100 may determine that the application is essential and as such select the essential application icon 524. Selecting the essential application icon 524 may have one or more effects, depending on the specific implementation. It is anticipated that an essential application may be configured to remain displayed on the device 100 or other associated display device if the device 100 is removed from the vehicle-mounted position.

Various features, buttons, icons, controls, and other aspects of applications may be selected by one or more users, or selected by device 100 in response to predetermined conditions. It is an aspect of the present disclosure that these applications may be selected and controlled by device 100, and/or at least one associated peripheral vehicle device.

It is another aspect of the present disclosure that the GUI may include a console application tray 504. The console application tray 504 may be configured to provide access to available console applications 508a, 508b, 508c. In addition, the console application tray 504 may display console applications available from an application store and/or provide a link to an application store via one or more icons 520. Whether applications have been installed, displayed, purchased, or are available for purchase via the application store icon 520, the various status of an application may be indicated in the console application tray 504. For example, if an application is installed and displayed on the device 100, the application icon in the console application tray 504 may appear differently from other icons that are not installed and displayed. In other words, if the icons are displayed in color to illustrate one or more state, they may appear in black and white, or grayscale, to indicate one or more other states. Therefore, given the previous example, available applications may have full color application icons, whereas installed and displayed icons may have grayscale icons. It is anticipated that various states of at least one application icon may be illustrated using various colors, intensities, transparencies, glows, shadows, and the like.

In some embodiments the console application tray 504 may be accessed by dragging a tray handle 516 or other feature to reveal the console application tray 504. Other embodiments may use gesture recognition features of the touch sensitive display 208, gesture capture region 206, and/or hardware buttons 280 to access the console application tray 504. For instance, the tray 504 may be revealed by a gesture drag on the display 208 using one or more fingers. In addition, the tray 504 may be displayed in response to a predetermined state of the device 100. Revealing the console application tray 504 may be visually represented in a number of ways. Moreover, the effect that revealing the tray may have on displayed applications may also be represented in a number of ways. In some embodiments, the console application tray 504 may fly-out from a side of the device 100. In other embodiments the console application tray 504 may appear from a location of the display 208. The manner in which the console application tray 504 transitions can be configured with regard to speed, color, transparency, audio output, and combinations thereof. In another embodiment, the console application tray 504 may be "pulled" in a direction 530 from a side of the device 100 to appear over displayed applications. In yet another embodiment, the console application tray 504 may be pulled from a side of the device 100 to share the display 208 with any displayed applications 512a, 512b, 512n. This embodiment may require the resizing of displayed applications 512a, 512b, 512n to provide adequate display area for the revealed tray 504. In one embodiment, as the tray 504 increases in size, the displayed applications may decrease in size, and vice versa.

Figure 5B:
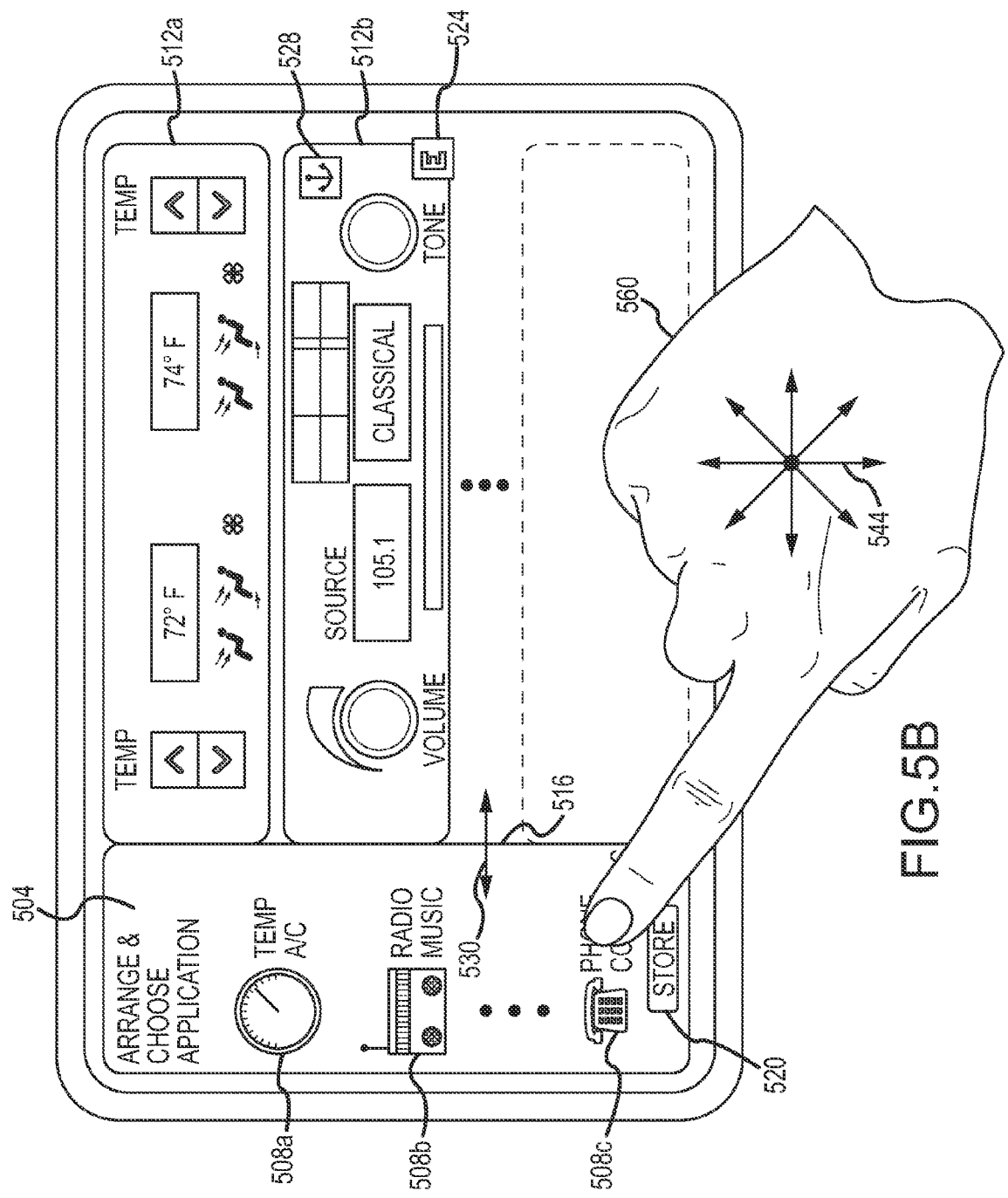
FIG. 5B depicts a second representation of a graphical user interface of a configurable vehicle console in accordance with one embodiment of the present disclosure.

FIG. 5B depicts a second representation of a GUI of a device 100 in accordance with embodiments of the present disclosure. In embodiments, a user 560 may interface with the GUI and/or the touch-sensitive display 208 to "drag-and-drop" new applications 508a, 508b, 508c, into an application-expanded position on the GUI, where applications 512a, 512b, . . . , 512n are shown in a functional state. Additionally, or alternatively, a user 560 may drag applications 512a, 512b, . . . , 512n from the application-expanded position of the GUI into the application tray 504. It is anticipated that moving an application from the application-expanded position of the GUI to the application tray 504 may hide and/or remove the chosen application from the application-expanded position of the GUI. It is further anticipated that once returned to the application tray 504, the application may be returned to its previous position via user 560 or automatic input. In some embodiments, the applications may be moved and/or positioned on the GUI according to a directional input 544 provided by the user 560. When a user 560 wishes to initiate a directional input 544 and move of a given application, the user 560 may initiate such a move by a touch, touch and hold, and/or other input gesture. It is an aspect of the present disclosure that moving an application 512a, 512b, . . . , 512n from the application tray 504 to an application-expanded position on the GUI does not necessarily initiate a function of the application. Application icons may be moved, repositioned, deleted, hidden, and/or otherwise shown by received input. Once the applications are positioned in a desired configuration, any functionality associated with the positioned applications may be accessed via further input.

Figure 5C:
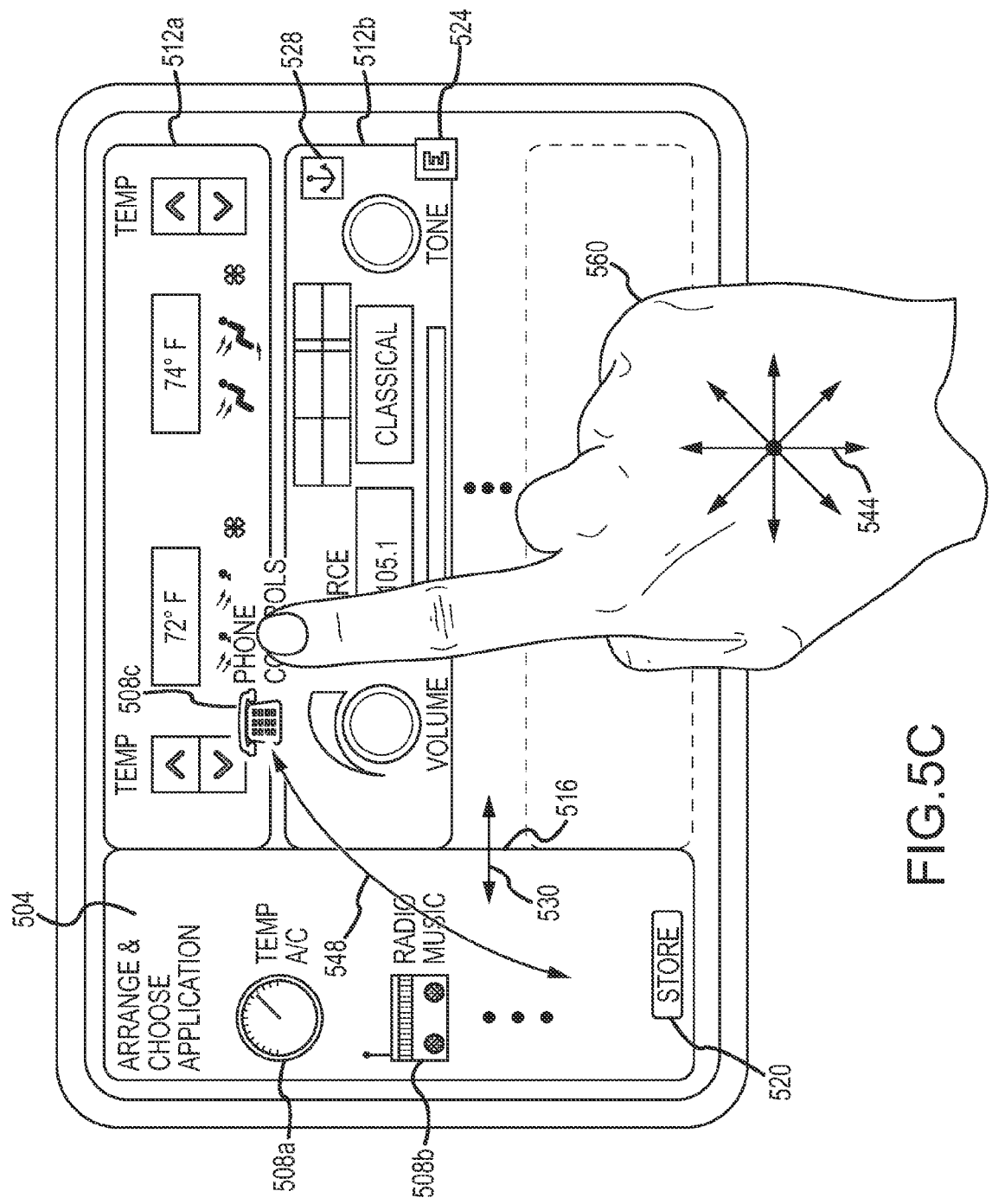
FIG. 5C depicts a third representation of a graphical user interface of a configurable vehicle console in accordance with one embodiment of the present disclosure.

FIG. 5C depicts a third representation of a GUI of a device 100 in accordance with embodiments of the present disclosure. As described above, a user 560 may position one or more applications 508a, 508b, 508c from the application tray 504 to an application-expanded position via an input gesture. Although, the applications may be automatically moved to and/or from various positions on the GUI via a processor and rules, a user 560 may arrange the applications on the GUI as desired. For example, FIG. 5C shows a user 560 moving an application 508c from the application tray 504 between two applications 512a, 512b that already occupy an application-expanded position of the GUI. The user 560 may drag and/or drop the application to various positions according to directional input 544. For instance, the user 560 has dragged the application 508c along a line 548 to hold between two applications on the GUI 512a, 512b.

FIG. 5D depicts a fourth representation of a GUI of a device 100 in accordance with embodiments of the present disclosure. Continuing the example described immediately above, the dragged application 508c may be positioned between and/or adjacent to at least one application. Alternatively or additionally, the dragged application 508c may be placed into a position as a first application, where no other applications are shown in the application-expanded position of the GUI. In some embodiments, a dragged application 508c, when positioned between or adjacent to other applications in the application-expanded position of the GUI may automatically move and/or resize one or more of the other applications along a directional line 556. Although shown in a linear vertical direction, the directional line along which applications are moved may be linear or non-linear, and may be in any direction vertical, horizontal, angled, and/or combinations thereof. For example, FIG. 5D shows application 512b moving below the dragged application 508c to accommodate room for the dragged application 508c when it is dropped, or placed, and expands into an expanded-state. Once a desired position is found for the dragged application 508c, the user 560 may drop the dragged application 508c in place.

Figure 5E:
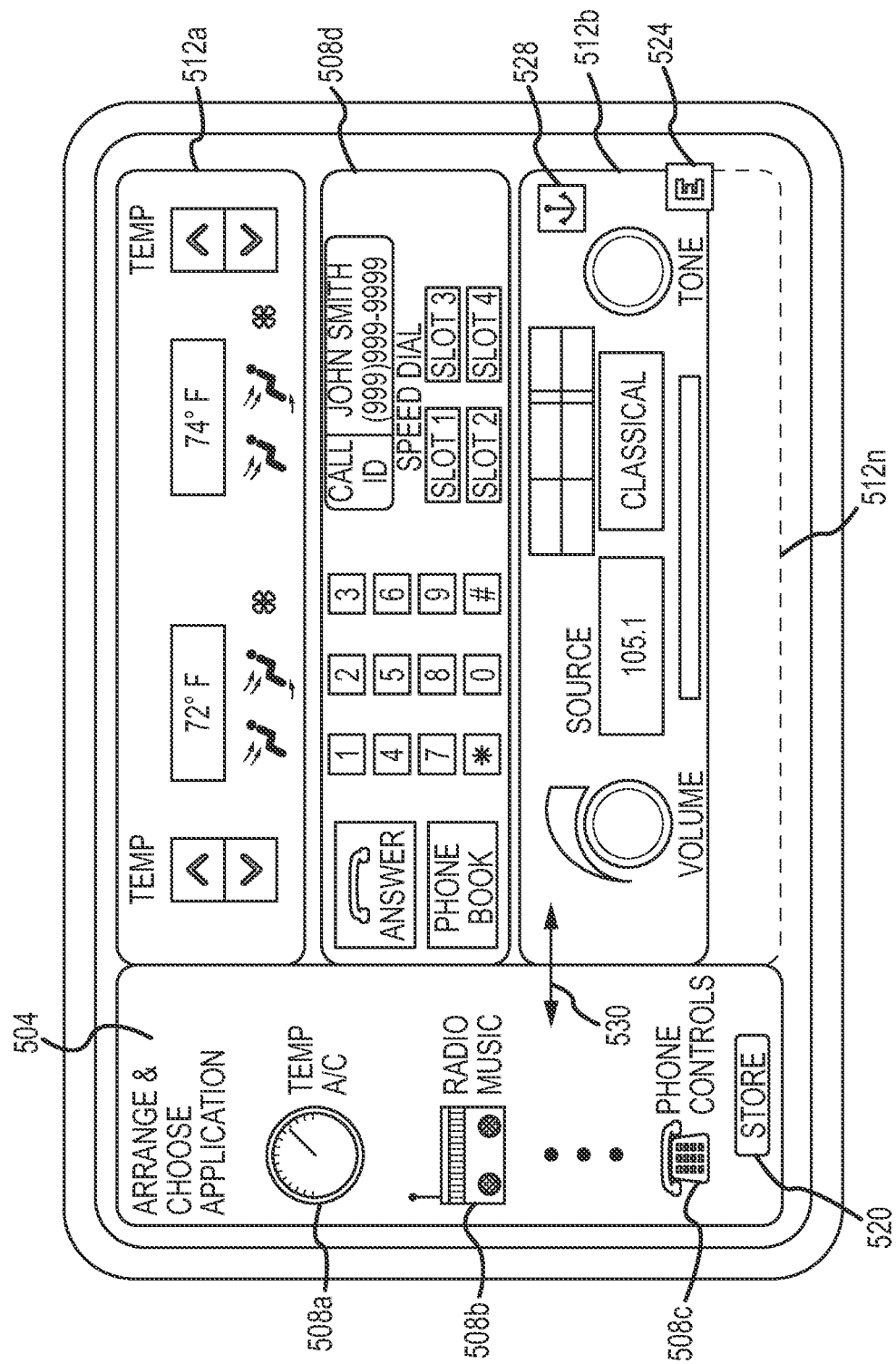
FIG. 5E depicts a fifth representation of a graphical user interface of a configurable vehicle console in accordance with one embodiment of the present disclosure.

FIG. 5E depicts a fifth representation of a GUI of a device 100 in accordance with embodiments of the present disclosure. As described above, in some embodiments, a dragged application 508c may resize, or expand, into a position on an application-expanded position on the GUI. FIG. 5E shows a dragged application 508c that has been moved into an application-expanded position along with functional features associated with the expanded application 508d. The expanded application 508d may be resized and/or repositioned as described above. Different layouts and/or configurations may be found in a common position in a menu structure.

Referring now to FIG. 6A, a sixth representation of a GUI of a configurable vehicle console is shown in accordance with an embodiment of the present disclosure. In some instances, the GUI may show a warning, message, and/or application output that utilizes all, or a substantial portion, of the display 208. Although applications may utilize a portion of the display 208 and even be configured for functionality and aesthetics, it is anticipated that certain features are more important than others, especially in the event of an emergency. Therefore, it may be desired to display important information to the display 208 over, or in place of, other applications. For example, in the event of an accident, the vehicle may associate a number of warnings and/or messages to the event. In some cases, these warnings and/or messages may be important for the at least one vehicle operator and/or passenger to review and even respond to. As shown in FIG. 6A, a warning message, indicator, and/or cue image 604 may be presented to the display 208 by the device 100. This information may be presented in response to input detected by the device 100, through GPS, gyroscopic, and/or accelerometer data. Additionally or alternatively, the information may be presented in response to the device 100 detecting input received from the vehicle and/or at least one peripheral device associated with the vehicle.

The information (warnings, messages, cues, and the like) may be displayed permanently, semi-permanently, or temporarily depending on predetermined settings and/or legal requirements. Permanently displayed information may be shown if an individual has attempted to modify the device 100 or alter specific vehicle systems without authorization. Information of this type may also be displayed permanently if the vehicle and/or the device 100 detects a condition that warrants the permanent display of information, such as a catastrophic engine failure, a dangerous operating condition, and/or other similar conditions. Semi-permanent displayed information may be shown on display 208 until reset via an authorized method. For instance, if the vehicle requires maintenance, a semi-permanent image may be displayed until the maintenance has been received and the semi-permanent image is removed. It is anticipated that the removal of semi-permanent images may be made by authorized personnel. Authorized personnel may make use of special input, and/or devices to remove/reset the image from the display 208.

In some embodiments, one or more images 604 (associated with warnings, messages, cues, and the like) may appear on the display 208, which are then followed by directions, recommendations, and/or controls. Continuing the previous example, if a vehicle is involved in an emergency event (such as an accident), a warning image may be displayed followed by directions and access to specific vehicle controls. The displayed image 604 may be shown above other applications 608 that are displayed on the device 100. Additionally or alternatively, the displayed image 604 may replace other applications and/or displayed information previously shown on the display 208.

Figure 6B:
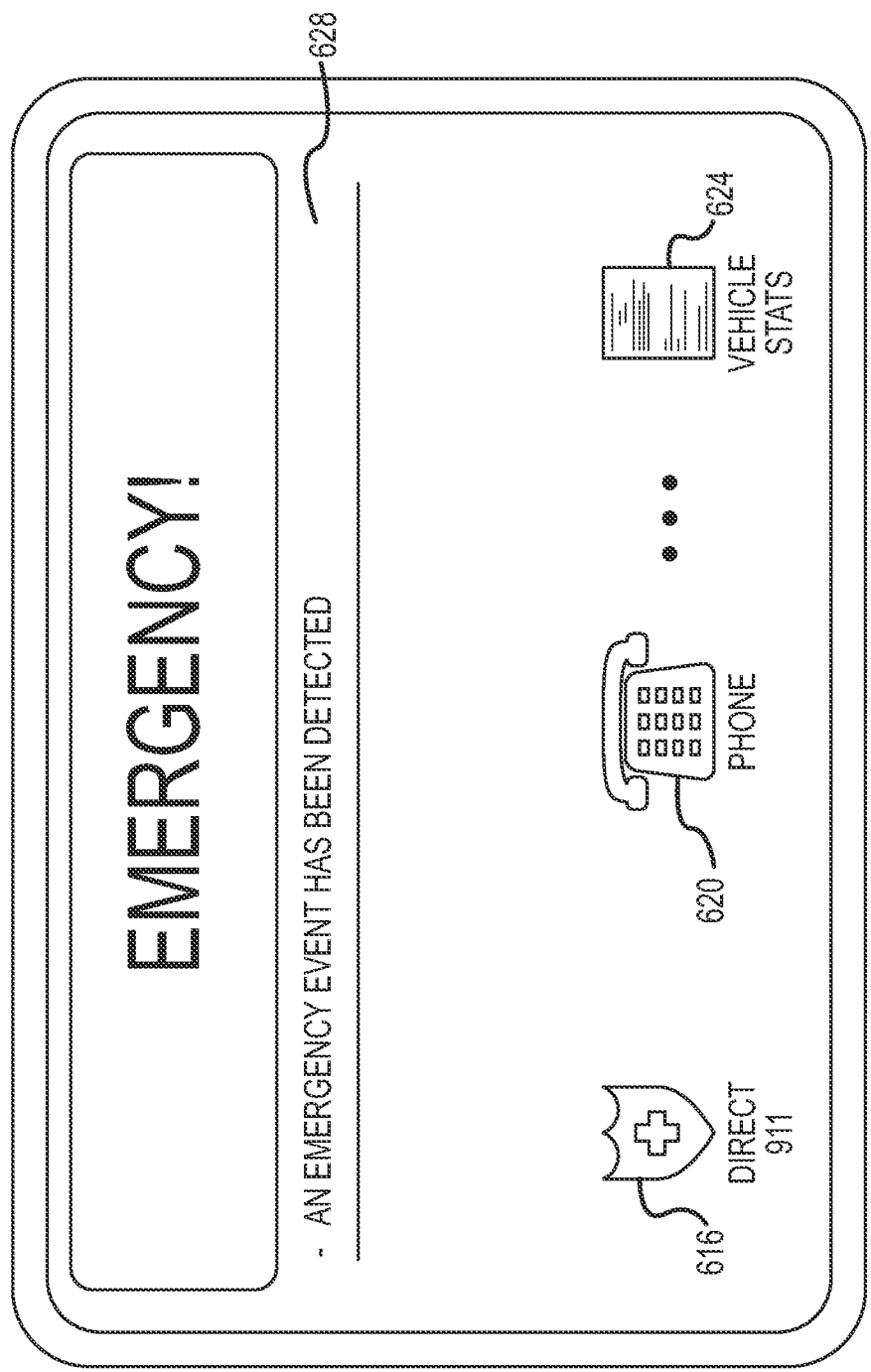
FIG. 6B depicts a seventh graphical user interface of a configurable vehicle console in accordance with one embodiment of the present disclosure.

FIG. 6B depicts a seventh representation of a GUI of a configurable vehicle console shown in accordance with an embodiment of the present disclosure. Following the emergency example illustrated above, a warning indicator 612, a message 628, and several controls 616, 620, 624 may be shown on the display 208 in the event of an accident or the like. As can be appreciated, in the event of an accident or emergency state, certain applications and displayed information may not be necessary to or even desired by a vehicle operator and/or passenger. In fact, such data may be considered overwhelming to an individual in the event of an emergency. During these stressful times, only key information and controls may be solicited by a vehicle operator and/or passenger. Accordingly, it is one aspect of the present disclosure to provide a warning indicator 612 that may be text, an image, or combinations thereof. This warning indicator 612 alerts at least one individual that an emergency has been detected by the device 100, the vehicle, and/or associated peripheral device. Audible alerts may also accompany any function, display, and/or warning as described herein. Audible alerts may be played through the device 100, via a speaker 268 or other output. Additionally or alternatively, the audible alerts may be played through an associated peripheral device, and/or a speaker system associated with the vehicle.

Accompanying the warning indicator 612 may be directions, recommendations, or other information in the form of a message 628 that may be interpreted by at least one vehicle operator and/or passenger. This message 628 may include a brief description of the event that caused the alert.

In some embodiments, one or more control icons 616, 620, 624, may be displayed onto the device 100 to provide assistance during the emergency event. For instance, by selecting the "Direct 911" icon 616 from the display 208 a call may be initiated to emergency services at 911 (112, 119, 999, 000, and/or other emergency service contacts). In the event of a less serious accident, phone functions may be controlled with the phone icon 620. It is anticipated that selecting the icon will allow standard phone functions to appear on the display 208, including but not limited to, speed dial, dial keypad, on-hook, off-hook, phone book, and the like. In both of these communication embodiments, the device 100 may make use of an internal communication antenna and communications service. Alternatively, the device 100 may be associated with one or more communication devices, such as a mobile phone, smart-phone, WiFi communication device, SMS, texting device, and the like, where the associated one or more devices may be controlled through the device 100.

In some embodiments, an icon may be included to access vehicle statistics that could prove useful in communicating with emergency personnel. When selected, the vehicle statistics icon 624 may list conditions of the vehicle, orientation, location, forces recorded, and other information that may be used in post-accident analysis. For example, an individual may have been involved in a roll-over collision that renders the vehicle inoperable, and upside-down. While communicating to emergency services via the communication method described above, the individual may be prompted to access (select) the vehicle statistics icon 624 to determine if the vehicle fuel system has been compromised and/or if any fire is detected. If so, the individual may be encouraged to move away from the vehicle and/or take a different course of action than if no vehicle statistics were checked. Any number of statistics may be displayed by selecting this icon 624, but it should be appreciated that the statistics may be ordered in levels of critical importance. Although described with respect to an emergency scenario, it should be appreciated that these warnings, messages, associated content, and behavior may be introduced by the device 100 as a response to predetermined input.

Figure 7:
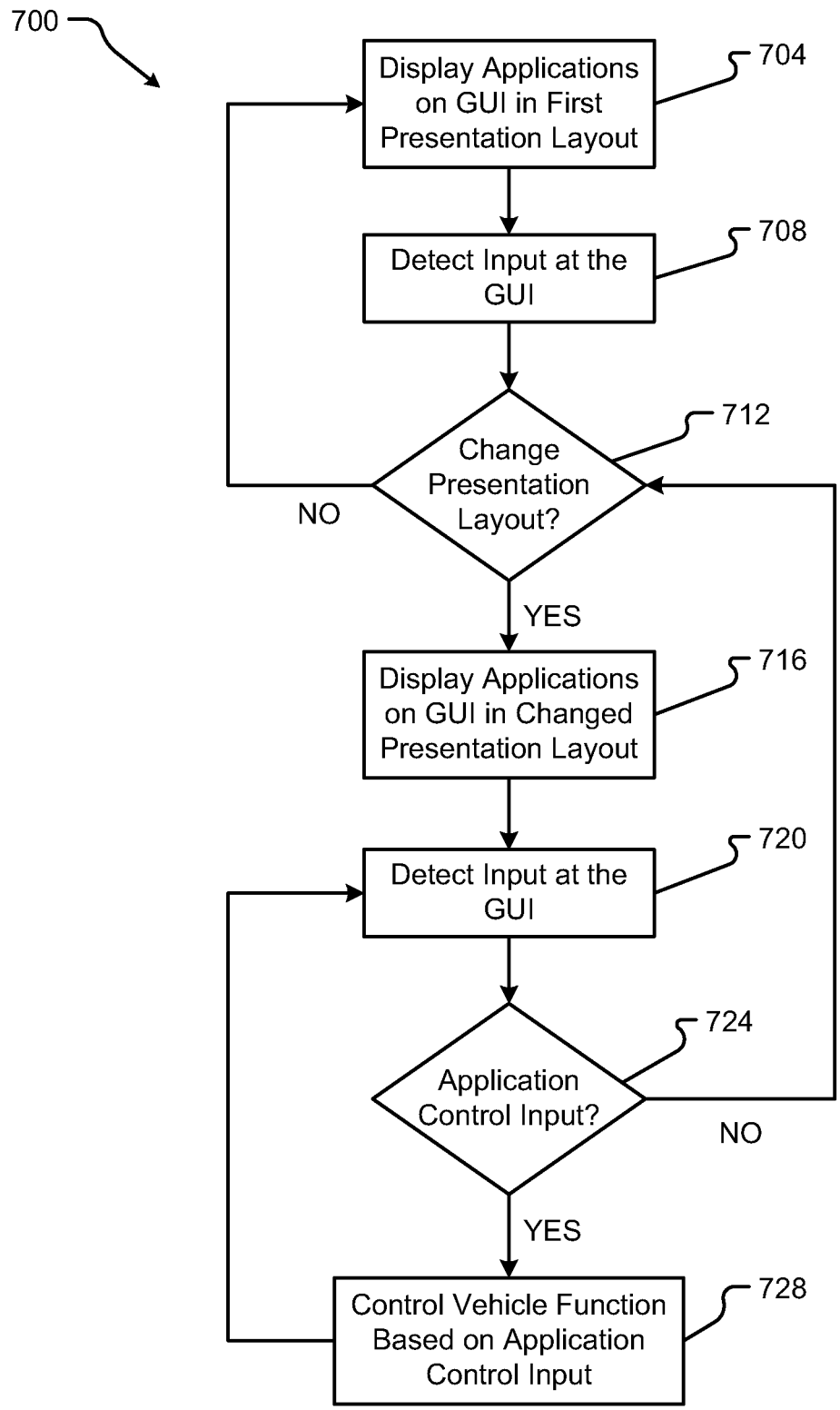
FIG. 7 is a flow diagram depicting a configurable vehicle console method in accordance with embodiments of the present disclosure.

Referring to FIG. 7, a flow diagram depicting a configurable vehicle console method 700 is shown in accordance with embodiments of the present disclosure. A device 100 may be displaying one or more applications on the GUI in a first presentation layout (step 704). The method continues by detecting input received at the device 100, in particular at the GUI (step 708). This input is interpreted by the device 100 to determine a corresponding processor action (step 712). For instance, the received input may represent an instruction to change the first presentation layout displayed on the device 100 at which point the method continues at step 716. Alternatively, the received input may be some other type of recognized and/or unrecognized input and the processor may determine alternate action based on this input. In the event that the input is determined as an instruction to change the presentation layout, the processor selects a second presentation layout to display on the GUI, and sends a command to display the second presentation layout at step 716.

The method 700 may continue by detecting further input at the GUI (step 720). This further input may represent a plurality of commands, including but not limited to a change presentation layout command or an application control command. In the event that the input represents a change presentation layout command, the method may continue at 712. However, in the event that the input represents an application control command, the method continues at step 728. The processor may determine which vehicle function is to be controlled based on the input and control the function as the input directs (step 728). Once the vehicle function is controlled, the method 700 may continue at step 720 to detect additional input and may even repeat the process 700.

Figure 8:
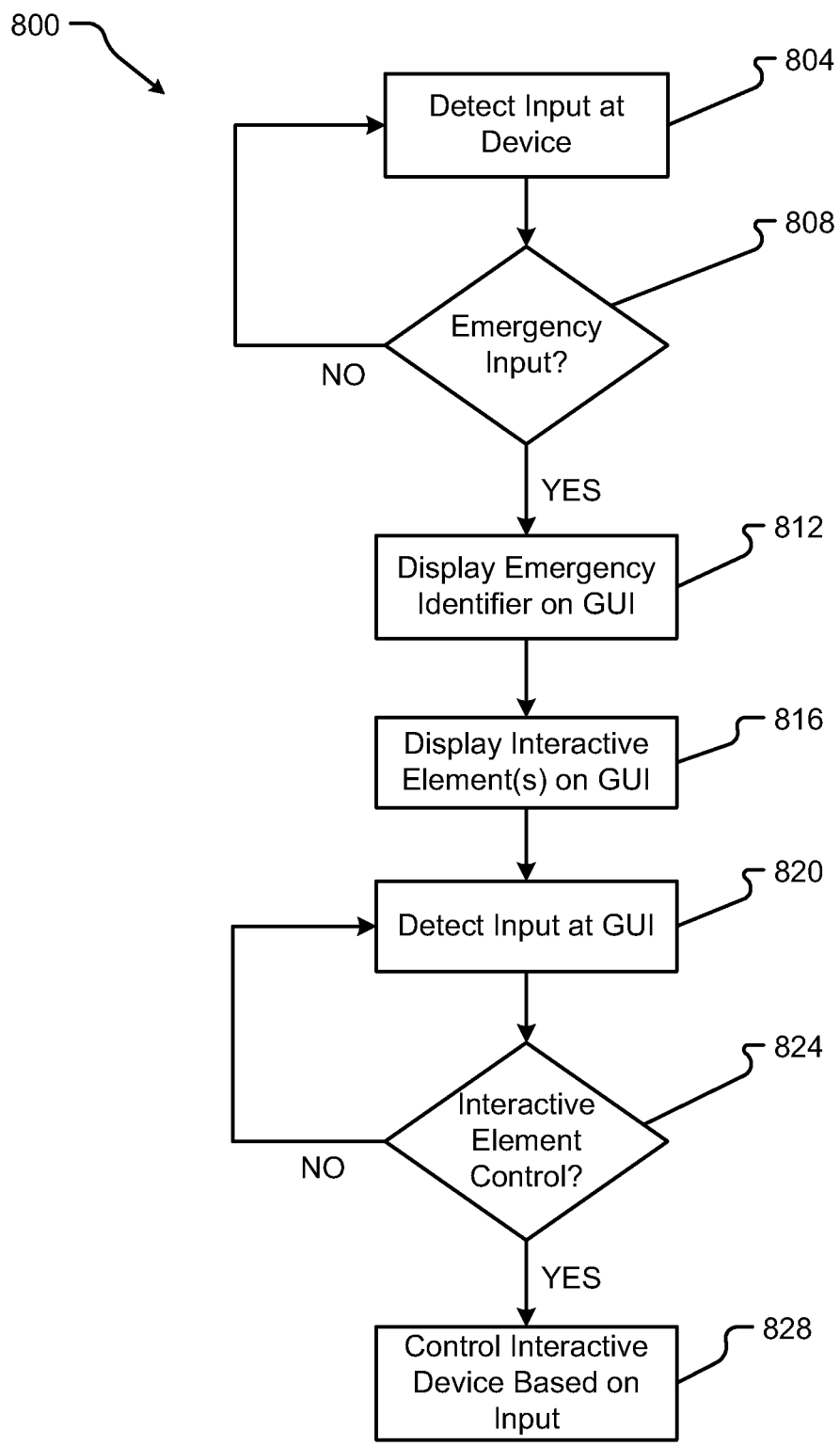
FIG. 8 is a flow diagram depicting a configurable vehicle console method in accordance with embodiments of the present disclosure.

FIG. 8 is a flow diagram depicting a configurable vehicle console method 800 in accordance with embodiments of the present disclosure. In general, the method 800 is directed to an automatically configurable console in response to specific inputs detected. The method begins at step 804, where the device detects input received. This input may be received via a communication interface with the vehicle and/or with associated devices. For instance, input may include but is not limited to that received from one or more phones associated with a vehicle. Additionally or alternatively, the input may be received from sensors and/or equipment associated with the vehicle. For example, the input may be in the form of a sensor signal sent via CAN Bus and associated controllers to the device 100. The method 800 continues at step 808, where the processor determines whether the input received qualifies as an emergency event. It may be desired to store in memory specific signals and/or signal conditions that the device 100 may refer to in determining one or more emergency event matches. In the event that the input received indicates an emergency event has occurred, an emergency identifier may be displayed on the GUI (step 812). This identifier may be displayed on any available GUI that is in communication with, or part of, the device 100.

The method 800 may display one or more interactive elements when an emergency is detected (step 816). These interactive elements may, as described above, include phone controls, vehicle statistics, and emergency communication contact icons. It is anticipated that these icons, although represented on a touch sensitive display 208, may be activated and/or selected through various inputs other than touch. The device 100 may detect input at the GUI, which may be equipped with various features as described above, including a camera, microphone, and touch sensitive display (step 820). For example, the device 100 may be configured to receive audible, visual, touch, and/or a combination thereof as the various input. Additionally or alternatively, one or more specific icons may be selected automatically by the processor. This automatic selection may be in response to certain signals that represent a priority of emergency.

The method continues where the input is determined to represent an interactive element control or another input altogether (step 824). In the event that the input detected represents an instruction to control an interactive element, the processor determines which interactive element is to be controlled based on the input and controls the interactive element (step 828). In some embodiments, this interactive element may include a device that is associated with the vehicle and/or the device 100.

The exemplary systems and methods of this disclosure have been described in relation to configurable vehicle consoles and associated devices. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof.

Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In some embodiments, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of configuring a vehicle control system graphical user interface ("GUI") to display a plurality of vehicle applications, comprising:
   displaying, at a first time, a plurality of applications in a first presentation layout on at least a first GUI, wherein the plurality of applications are configured to communicate with at least one vehicle function associated with each application;
   receiving a first input at the at least a first GUI, wherein the first input corresponds to an instruction to alter the first presentation layout to a second presentation layout based on one or more emergency vehicle operational states, wherein the first presentation layout corresponds to a first position and behavior of each application of the displayed plurality of applications on the at least a first GUI and the second presentation layout corresponds to a second position and behavior of each application of the displayed plurality of applications different from the first presentation layout;
   selecting, by a processor, the second presentation layout to display on the at least a first GUI;
   sending, by a processor, a command to display the second presentation layout on the at least a first GUI; and
   displaying, at a second time, the second presentation layout on the at least a first GUI.

2. The method of claim 1, further comprising:
   receiving a second input at the at least a first GUI, wherein the second input manipulates at least one control associated with at least one application of the plurality of applications;
   determining, by a processor, a vehicle function to control based on the second input; and
   controlling the determined vehicle function based on the second input.

3. The method of claim 1, wherein the first input comprises a movement from a first position on the at least a first GUI to a second position on the at least a first GUI.

4. The method of claim 1, wherein altering the first presentation layout to the second presentation layout includes adding at least one application to be displayed on the at least a first GUI.

5. The method of claim 1, wherein altering the first presentation layout to the second presentation layout includes removing at least one application from being displayed on the at least a first GUI.

6. The method of claim 1, wherein the vehicle functions include one or more of the climate system, audio system, mechanical features, electrical features, trip computer, associated phone, map, vehicle statistics and guidance system.

7. The method of claim 1, further comprising:
   receiving, one or more signals sent from a plurality of sensing elements associated with a vehicle;
   interpreting, by a processor, the one or more signals to determine whether an emergency event has occurred;
   determining that an emergency event has occurred; and
   displaying, automatically, an emergency identifier on the at least a first GUI.

8. The method of claim 7, wherein the interpretation step further comprises:
   referring to a memory, wherein the memory stores rules that define a plurality of signal conditions corresponding to an emergency event.

9. The method of claim 7, wherein the emergency identifier is displayed as a third presentation layout on the at least a first GUI.

10. The method of claim 7, wherein the emergency identifier is displayed over at least one of the first and second presentation layout on the at least a first GUI.

11. The method of claim 10, wherein an appearance of at least one of the first and second presentation layout is altered to emphasize the display of the emergency identifier.

12. The method of claim 7, further comprising:
displaying automatically one or more interactive emergency elements on the at least a first GUI, wherein at least one of the one or more interactive emergency elements is configured to control a device associated with the vehicle.

13. The method of claim 12, wherein the controlled at least one device is communication hardware.

14. The method of claim 12, wherein the emergency identifier is displayed on a second GUI.

15. A non-transitory computer readable medium having instructions stored thereon that, when executed by a processor, perform the method comprising:
displaying, at a first time, a plurality of applications in a first presentation layout on at least a first GUI, wherein the plurality of applications are configured to communicate with at least one vehicle function associated with each application;
receiving a first input at the at least a first GUI, wherein the first input corresponds to an instruction to alter the first presentation layout to a second presentation layout based on one or more emergency vehicle operational states, wherein the first presentation layout corresponds to a first position and behavior of each application of the displayed plurality of applications on the at least a first GUI and the second presentation layout corresponds to a second position and behavior of each application of the displayed plurality of applications different from the first presentation layout;
selecting, by a processor, the second presentation layout to display on the at least a first GUI;
sending, by a processor, a command to display the second presentation layout on the at least a first GUI; and
displaying, at a second time, the second presentation layout on the at least a first GUI.

16. The non-transitory computer readable medium of claim 15, wherein the method further comprises:
receiving a second input at the at least a first GUI, wherein the second input manipulates at least one control associated with at least one application of the plurality of applications;
determining, by a processor, a vehicle function to control based on the second input; and
controlling the determined vehicle function based on the second input.

17. The non-transitory computer readable medium of claim 15, wherein the method further comprises:
receiving, one or more signals sent from a plurality of sensing elements associated with a vehicle;
interpreting, by a processor, the one or more signals to determine whether an emergency event has occurred;
determining that an emergency event has occurred; and
displaying, automatically, an emergency identifier on the at least a first GUI.

18. The non-transitory computer readable medium of claim 15, wherein the method further comprises:
displaying automatically one or more interactive emergency elements on the at least a first GUI, wherein at least one of the one or more interactive emergency elements is configured to control a device associated with the vehicle.

19. A device to configure a vehicle control system graphical user interface ("GUI") to display a plurality of vehicle applications, comprising:
a first GUI including a first display area;
a first input gesture area of the first display area;
a vehicle signal input/output port, wherein the vehicle signal input/output port is configured to receive and send signals to and from a plurality of vehicle controls;
a non-transitory computer readable medium having instructions stored thereon that, when executed by a processor, perform the method comprising:
displaying, at a first time, a plurality of applications in a first presentation layout on the first GUI, wherein the plurality of applications are configured to communicate with vehicle functions that are associated with each application;
receiving a first input at the first GUI, wherein the first input corresponds to an instruction to alter the first presentation layout to a second presentation layout based on one or more emergency vehicle operational states, wherein the first presentation layout corresponds to a first position and behavior of each application of the displayed plurality of applications on the first GUI and the second presentation layout corresponds to a second position and behavior of each application of the displayed plurality of applications different from the first presentation layout;
selecting, by a processor, the second presentation layout to display on the first GUI;
sending, by a processor, a command to display the second presentation layout on the first GUI; and
displaying, at a second time, the second presentation layout on the first GUI.

20. The device of claim 19, further comprising a second GUI including a second display area.

* * * * *